UNITED STATES PATENT OFFICE.

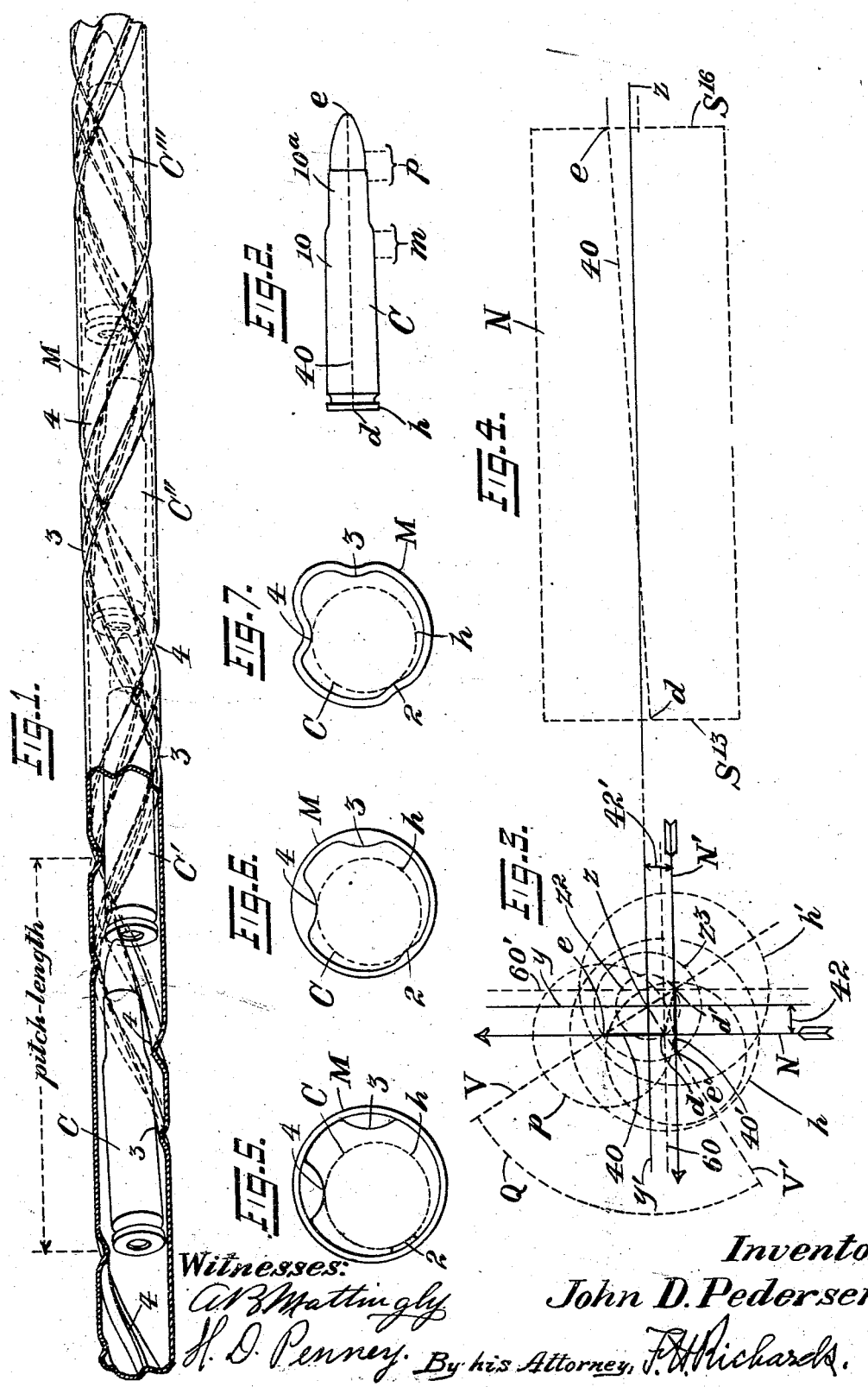

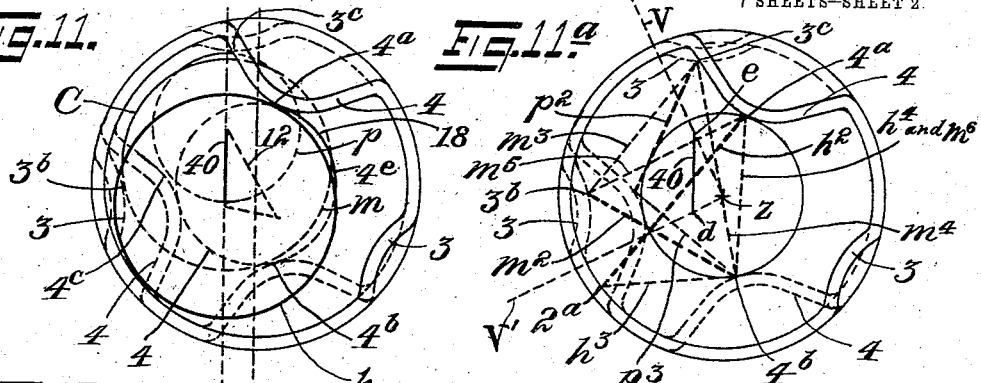
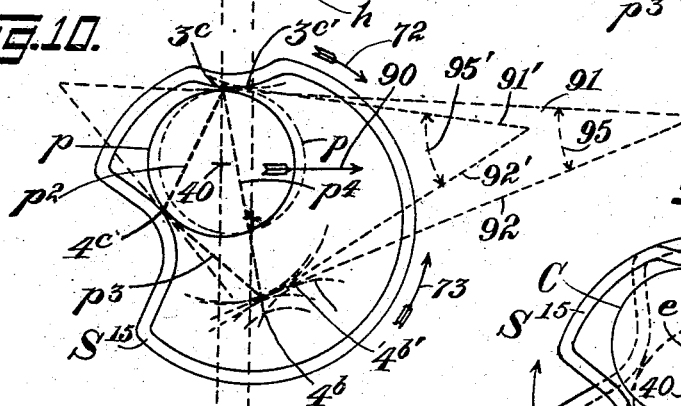
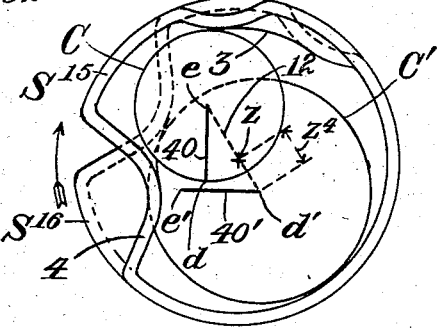
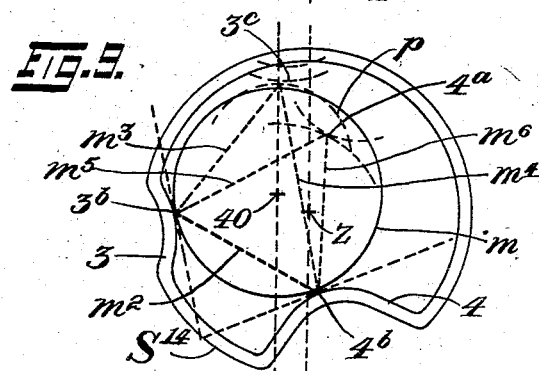
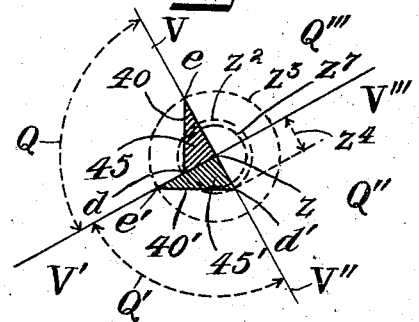
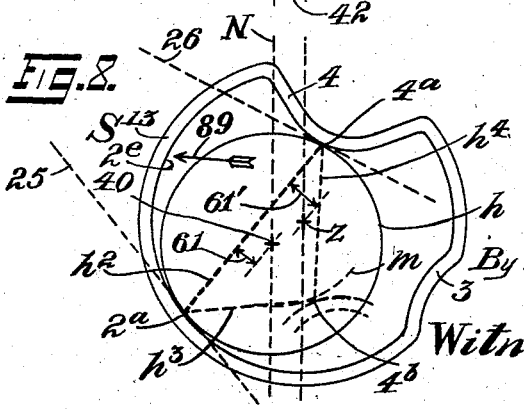

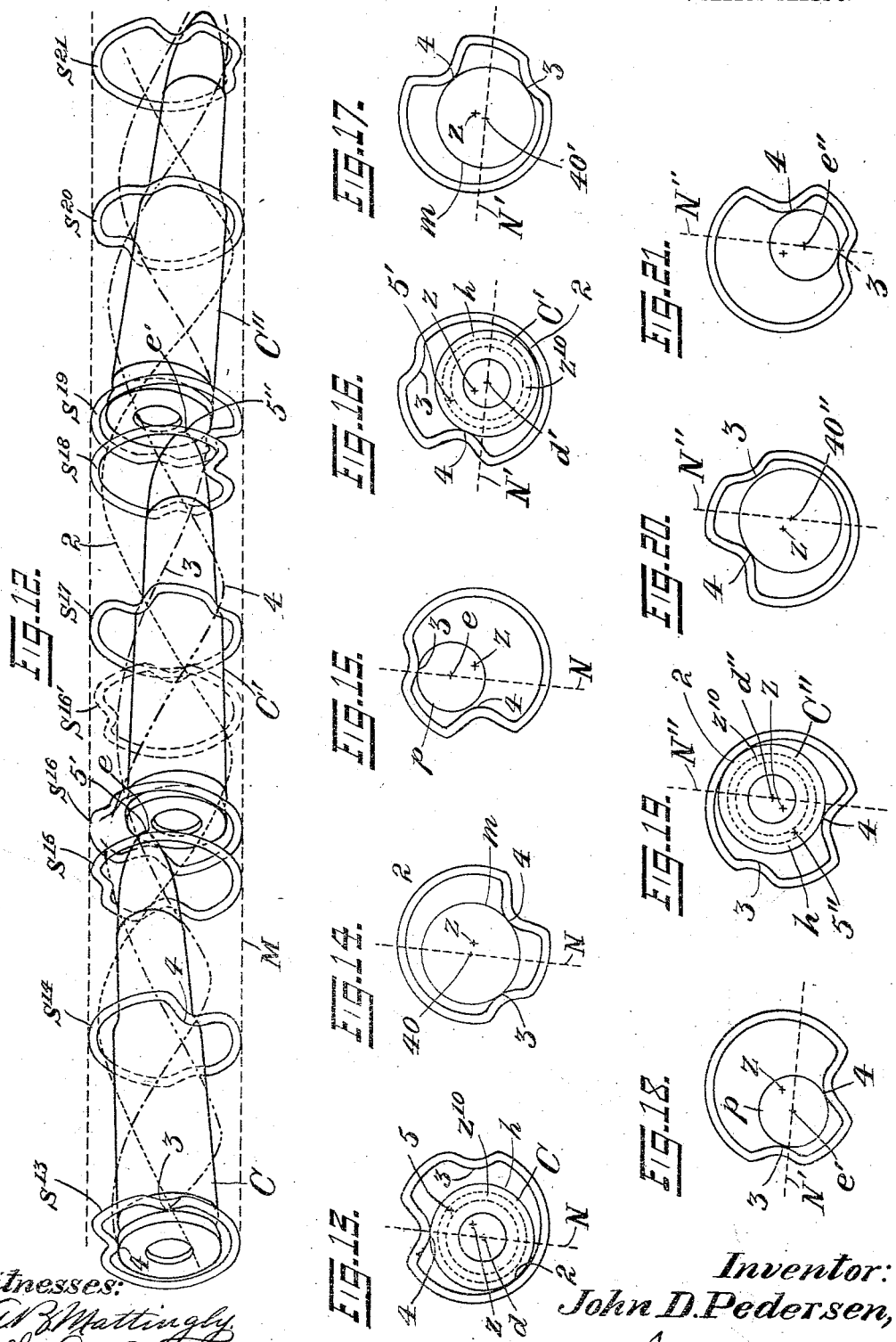

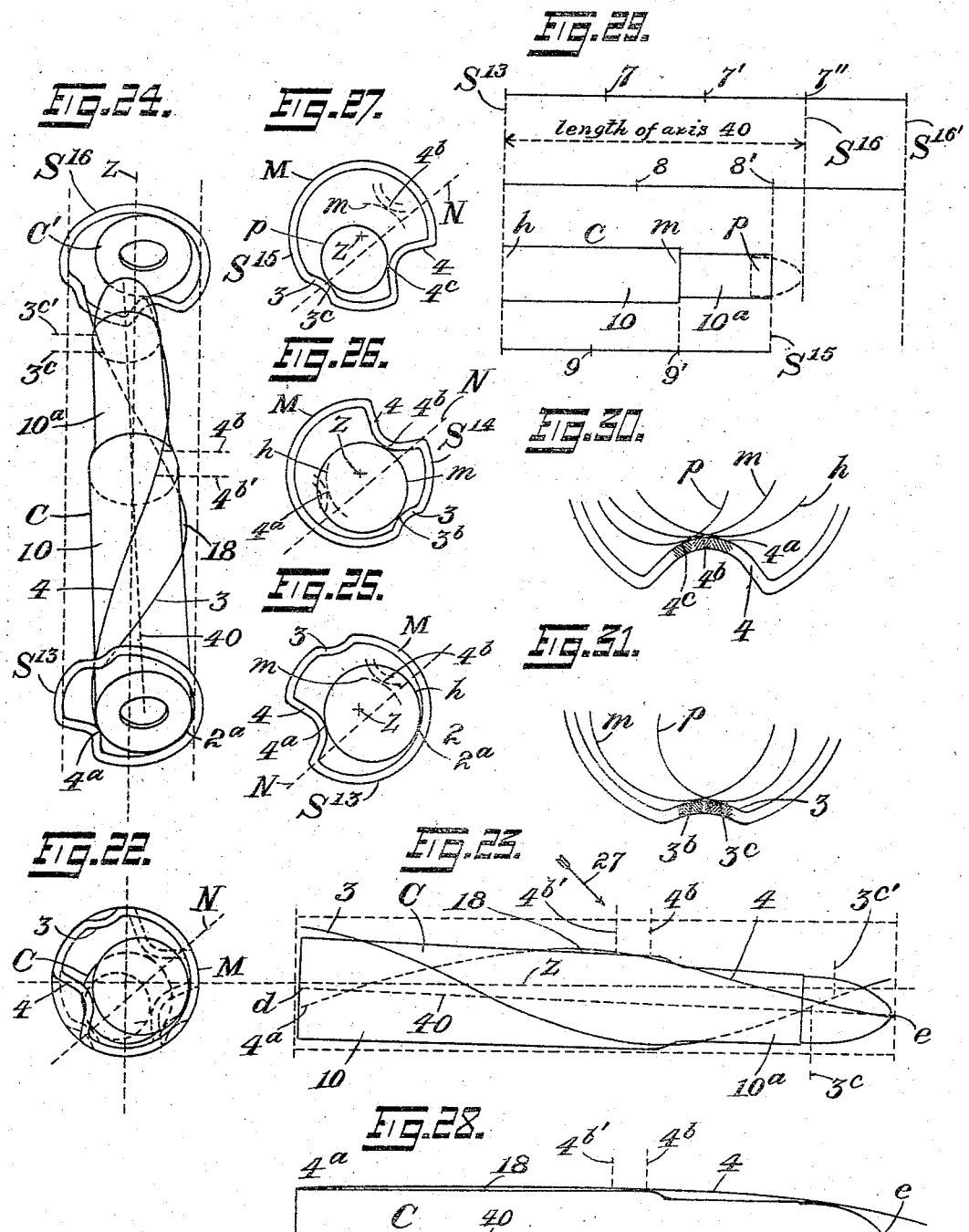

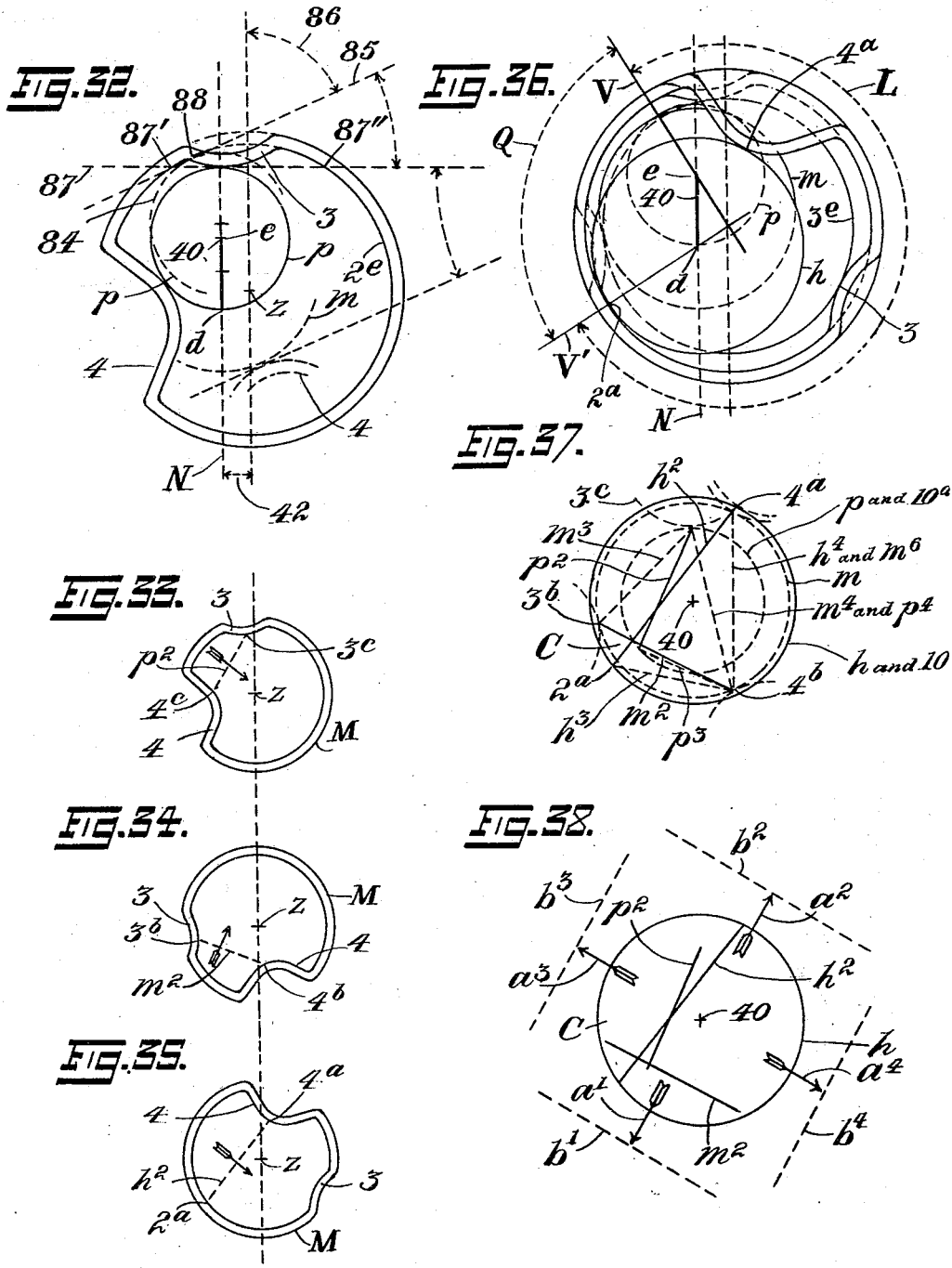

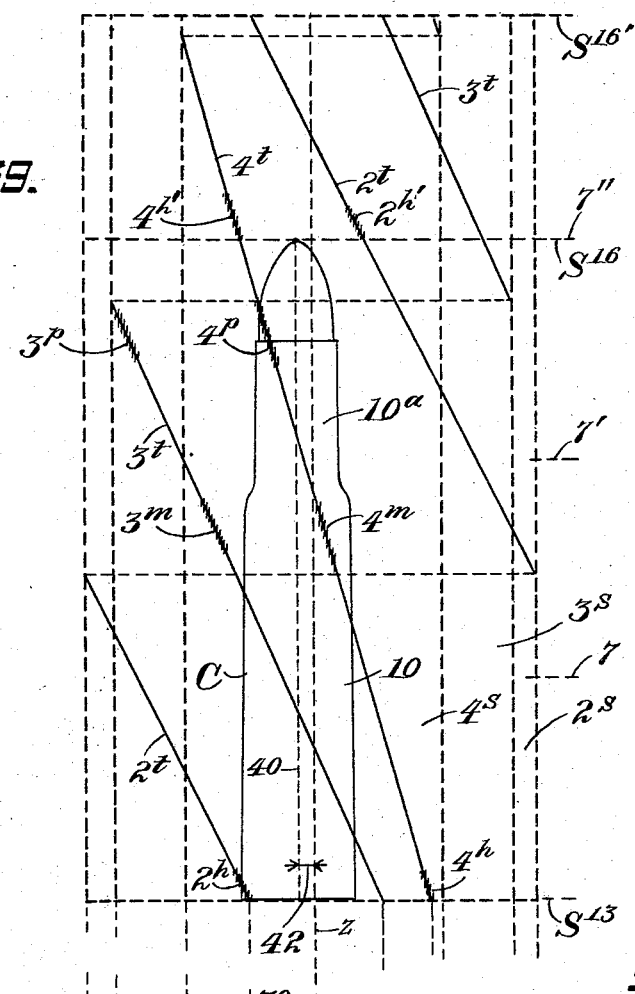
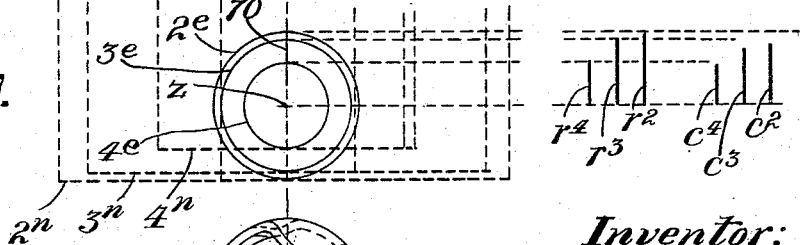

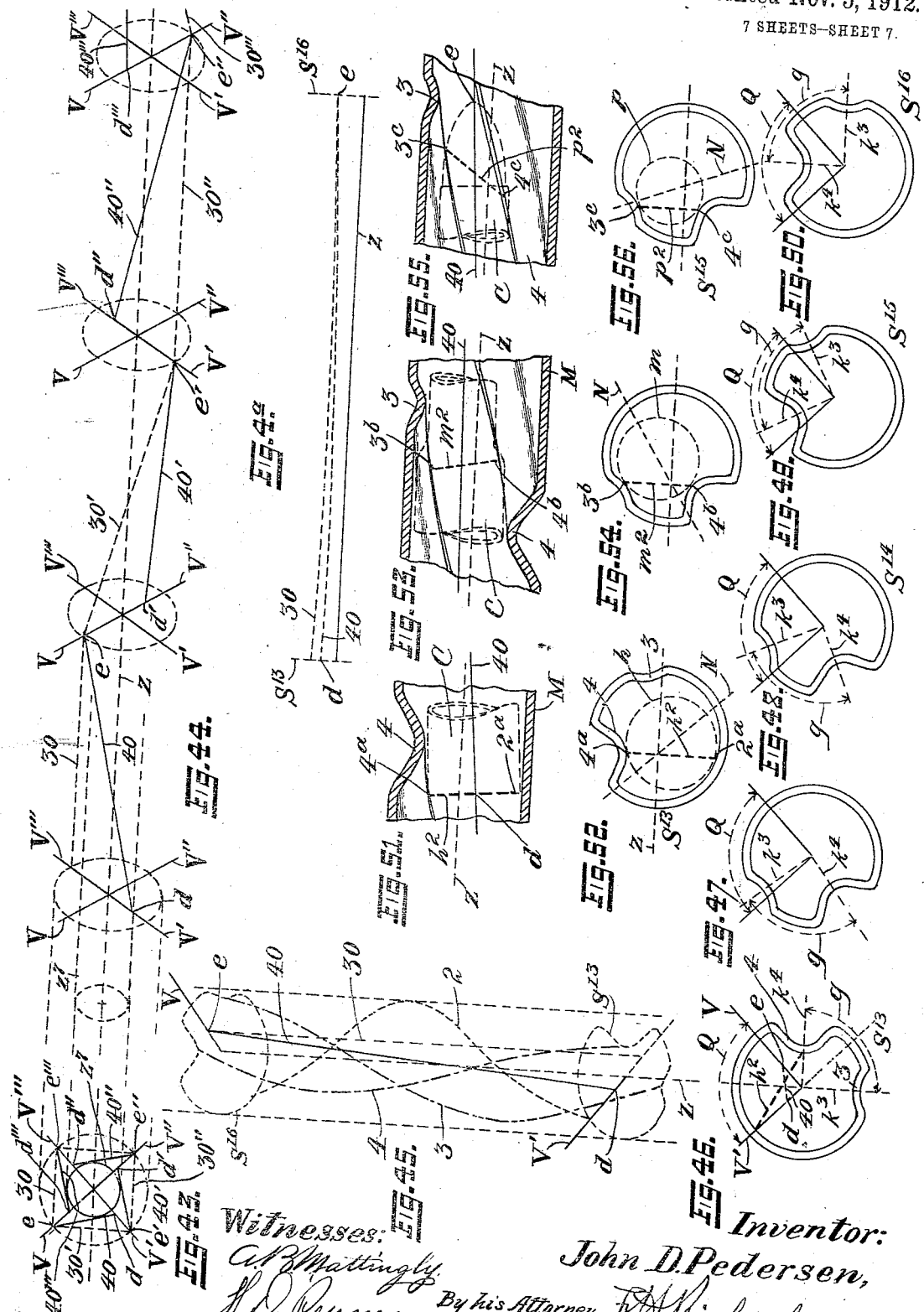

JOHN D. PEDERSEN, OF JACKSON, WYOMING.

MAGAZINE FOR FIREARMS.

1,043,354. Specification of Letters Patent. Patented Nov. 5, 1912.

Application filed February 10, 1912. Serial No. 676,823.

*To all whom it may concern:*

Be it known that I, JOHN D. PEDERSEN, a citizen of the United States, residing in Jackson, in the county of Uinta and State of Wyoming, have invented certain new and useful Improvements in Magazines for Firearms, of which the following is a specification.

My present invention is in the nature of an improvement in that class of cartridge magazines for fire-arms in which the cartridges are held in end-to-end contact within a tube.

A principal object of this invention is to furnish a magazine whereby and wherein rimless center-fire cartridges, (especially those having pointed bullets and using high power explosive) may be held in storage while under such complete positive and continuous individual control in fixed relative positions and in end-to-end safe-position contacts, that each cartridge will be protected against jamming or sticking and will freely move longitudinally in the magazine, not only during the operation of loading the cartridges into the magazine, but also during the transfer of a cartridge from the magazine into the barrel of a breech-loading fire-arm, and this regardless of the action of gravity or the position of the fire-arm. The loading operation is now performed with such extreme rapidity that even a slight sticking of a cartridge might seriously impede or defeat the operation of the gun mechanism, and thus become a source of loss and danger. For meeting these conditions I have devised a system of magazine construction in which the pointed end of one cartridge contacts with the head of a contiguous forward cartridge only in a narrow safe-zone outside of its centrally-located primer, whereby to avoid the premature or accidental firing of such forward cartridge by the too forcible contacting of the cartridges, whether this shall be caused by the shock of firing or otherwise. In this magazine, I locate and guide the cartridges by means of a plurality of helical guide-lines or bearing-path surfaces which are so combined and organized as hereinafter more fully described, as to accomplish the desired objects in an effective and reliable manner.

In practice it is preferable and convenient to make the magazine of a metal tube (preferably steel) and to have the larger portion of the external surface retained in or shaped to a substantially cylindrical form for use with some suitable bearing or guide relatively movable thereon, so the tube may form part of or be connected to the action-bar of the gun mechanism, and may be arranged to slide in a guide or bearing therefor. Such an arrangement is illustrated in United States Letters Patent, No. 963,171, granted to me July 5, 1910. Such tubes are readily produced of high quality and at a low cost, and are also especially suitable because of their normal stability and neatness of appearance. When the metal tube is of suitable ductility, the cartridge-guiding lines or paths may be formed therein by dies for helically shaping that portion of the tube in and of which such guide-surfaces shall be made. Neither the size nor shape of the external surface, or of the internal surface of the magazine tube is material to the operation of the magazine, except that the internal space must, of course, be sufficient for the free longitudinal movement of the cartridges, and that the several helical guide-line-surfaces or bearing-paths shall be located and curved for properly holding and guiding the cartridges.

This system of magazine construction is in accordance with the principle which I have discovered by extended experimental investigations, that the guide-lines arc and the axial-arc may (as a standard or basic proportion) be made complemental to each other, and their difference be equal to one-half their sum.

By the term "guide-lines arc", I refer to the circumferential advance of any one of the helical guide-lines in the longitudinal distance equal to one cartridge-length. By the term "axial-arc", I refer to the circumferential advance (around the magazine axis) of the cartridge axis in the same longitudinal distance. These features, I have hereinafter explained in connection with diagrams showing those relations of said arcs.

If, in a given instance, the guide-lines arc is three-fourths of a circle, and the axial-arc is one-fourth of a circle, clearly these arcs are complemental to each other, since their sum is equal to one circle. And when this axial-arc is subtracted from said guide-lines arc, their difference is obviously one-half of a circle. Thus their difference is one-half their sum. From this definite or exact proportion, in practice some variation, plus or minus, in each said arc, may in some cases be adopted, but in the present instance I have adopted these ratios as the preferred relation of those arcs, and have described a development of the system and its details in accordance therewith. I deem a guide-lines arc range of between two-thirds and four-fifths of a circle to be as great as practicable, unless in some instance where the cartridges are of unusual proportions.

A further object of my invention is to furnish a magazine organized in accordance with the foregoing principles and in such a manner as to hold each cartridge with its axis at a minimum inclination relatively to the magazine axis, and to accomplish this result by the method of locating each cartridge with its axis inclined in an axial-plane which is off-set from the magazine axis; and of locating the successive axial-planes in transverse directions. By this off-setting of the planes of the axes of contiguous cartridges, and constructing the curvatures of the guide-lines of an excess pitch-length as herein explained, the said axial planes are brought into transverse positions which may be at about right-angles, while the inclination of each cartridge axis in its own plane is minimized, and an effective three-bearing support for each cartridge is obtained.

In a self-loading rapid-firing gun of the class herein referred to, when the rearward cartridge in the magazine comes into position for being transferred into the loading mechanism, it is important in order to avoid premature explosions, that the safe-positions of the end-to-end contacts shall be continuously maintained, and that the cartridge shall be taken while at a minimum inclination in the plane of its axis, and also relatively to the magazine axis. These results are now readily obtainable by means of my system of magazine construction, which, though complex and intricate in character and function, is nevertheless simple as to number of parts and is of demonstrated efficiency and reliability in its practical operation. Because of these complex relations and the numerous combinations existing in the magazine, and because of the consequent difficulty of clearly and adequately stating the same, I have herein employed, in part, the method of description by graphics, and have exhibited those features by diagrams supplemental to the following written description.

In the accompanying drawings forming a part of this specification, and in which similar characters designate like parts in all the views, Figure 1 is a side view of a tubular magazine, M, made in accordance with my present invention; a portion of the tube is shown broken away for better illustrating how the cartridges are located therein; and the cartridge heads are drawn oblique or distorted for disclosing the end-to-end safe-positions of the point and head contacts. This figure shows the helical excess-pitch guide-lines 3 and 4 extending inwardly from the tube-wall of the magazine, and shows the tube of such diameter that a part of its inner surfaces form the guide-line 2, which thus coincides with the "inclusive" circle, and cylinder of the magazine. This cylinder being a geometrical figure having no thickness, will, of course, in the end views, appear as this inclusive circle, (see the circle at $2^a$, Fig. 8, and $2^e$, Fig. 40). By the term bearing-path, or guide-line, I refer to that path or surface, (herein a helical zone) upon which some portion of the cartridge is supported and guided as it moves along within the magazine.

Fig. 2 is a full side-view of one of the rimless cartridges, it being of the well known and typical shape, and of a formation which I designate as "two-cylinder," (see Fig. 29).

Fig. 3 is an end-view diagram (on an enlarged scale), illustrating certain relations of two off-set cartridges in end-to-end contact and having the planes of their axes N, N', located in transverse directions and with their axes 40, 40', inclined in such planes.

Fig. $3^a$ (on Sheet 2), is similar and supplemental to Fig. 3, and further illustrates the off-setting of the cartridge axes, 40, 40', and the relations of the respective position-angles 45, 45', to each other, to the orbital axis $z$, and to the orbits $z^2$ and $z^3$ of the head-center, $d$, and point-center, $e$, of the cartridges.

In Figs. 3 and $3^a$, the circle of the magazine is indicated as being divided into four approximate quadrants, of which the quadrant Q contains or incloses (fully or nearly, as the case may be) the area comprised within the three sides of the position-angle 45. The several quadrants are shown numbered in a direction oppositely of the direction commonly designated as "clock-wise", since the magazine, in this instance, (see Fig. 1) is shown having a right-hand, or "clock-wise" helix or twist; but this may, if preferred, be made with a left-hand helical form. The similar quadrant Q' incloses the corresponding position-angle 45'. Similarly, in Fig. $3^a$, the quadrant Q'' would inclose the position-angle for the cartridge C''; and the quadrant Q''' would inclose the such angle for the more advanced cartridge C''', as will be made clear by comparing this figure with the cartridges as shown in Figs. 1 and 12.

In Fig. 3, (which is drawn on twice as large a scale as Fig. 4) the orbital axis $z$ is shown located at the intersection of the two meridian lines $y$ and $y'$. The axial plane N of the cartridge axis 40 is shown located to one side of the line $y$ by the distance 42. The line $y$ indicates, in this instance, the vertical plane in which the orbital axis $z$ is located. Similarly, the axial plane N' of the cartridge axis 40', is shown located to one side (at the lower side as here arranged), of the line $y'$ by the similar distance 42'. The line $y'$ in this instance indicates the horizontal plane in which the said orbital axis $z$ is located.

In the lines N and N', Fig. 3, the heavily shaded portions 40 and 40', respectively, show the axes of two successive contiguous cartridges, and the extent of the inclination of these axes, in the said axial-planes. This figure corresponds in position with Figs. 8 to 11$^a$, to facilitate comparison. The line V is drawn through the orbital axis $z$ and is so located as to touch the upper end, $e'$, of axis 40, and the right-hand end of axis 40'. A dotted line, 60, is drawn parallel to and below meridian $y'$, in position to intersect the line N at the lower end $d$ of axis 40, and with this point as a center is drawn the circle $h$, representing the position of the head of a cartridge, (as C, Figs. 1 and 12) relatively to the orbital axis $z$, and to the other axes and meridians here shown. A similar line, 60', is drawn parallel to and at the right-hand of meridian $y$, in position to intersect line N' at the intersection of lines V and N', and around this point as a center is drawn the circle $h'$, representing the position of the head of the next successive cartridge, as C', Figs. 1 and 12.

Fig. 4 is a side view diagram supplemental to Fig. 3 (and on a scale reduced one-half), showing the inclination of the cartridge-axis, 40, in the plane, N, of said axis; and in relation to the magazine axis, $z$, which is also the orbital axis of the cartridges; the axial plane N is shown of one cartridge-length, from section $S^{13}$ to section $S^{16}$, in Fig. 12; also see Figs. 24, 29, and 39. For more fully and clearly exhibiting those relations of the cartridge axis 40 (extending one cartridge-length, from $d$ to $e$, see Figs. 3, 4, and 44), and of the axial-plane thereof, which obtain as between these and the said orbital axis, $z$, I have supposed that axial-plane (or geometrical figure) to be extended outwardly to have the width shown by the parallelogram in Fig. 4; for convenience, I have designated this plane by the single character, N. When said axial plane is indicated by a straight line, (as in some of the sectional views), the character N designates this line, which is then an end view of said plane. The axial-planes, (and the lines representing the same) of a series of successive cartridges are, respectively, distinguished by index-marks, as N, N', N'', and N'''.

Fig. 4$^a$, supplemental to Fig. 4 and on the same scale, is drawn adjacent to Figs. 43 and 46 to facilitate direct comparison therewith. In Fig. 4 the inclination of the axis 40 in the plane N, is the apparent inclination, when the said axis is viewed in a direction vertical to said plane, as for instance, from the right-hand of Fig. 3. But the axis 40 comes substantially within one quadrant, as Q, Fig. 3, and may be said to have a spiral or radial inclination relatively to the axis $z$, when the relation of different points in the length of the axis 40 is considered in connection with the orbital movement and the off-set and inclined position of the cartridge. For illustrating this peculiar feature or relation of said axis 40,— and the consequent effect on the location and direction of the line of the acting force as transmitted backward through one cartridge to the point of the next,—I have included in Fig. 4$^a$ some lines from Fig. 4. The distance $z^1$ corresponds to the distance between the axis $z$ and the head-center, $d$, of the cartridge; this is also indicated in Figs. 10$^a$, 43 and 44. At the right hand of said Fig. 4$^a$, the distance $z$ to $e$ corresponds to the height of the angle 45 on line V—V'' in Fig. 3$^a$; this distance is also shown in Figs 10$^a$, 46 and others. By taking the distances of successive points in the length of the axis 40, and radially to the axis $z$, and using them for plotting the curved line 40, Fig. 4$^a$, we then have a diagram showing the actual radial relations, or radial inclination, of the cartridge axis to the orbital axis throughout its length; and a representation of the relative parallelism of the two axes which results from the method of holding the cartridges with their axes inclined in off-set axial planes which are tangentially disposed about a circle and in transverse directions. This shows that the radial angles between the lines 30 and 40, and the axis $z$, are so low that said line of force tends hardly at all to crowd or deflect the cartridge toward any greater inclination, while the circumferential advance of the cartridge axis, 40, in the axial-arc operates to cause the cartridge to more nearly follow the twist or curvature of the guide-lines, so that the end thrust on the cartridge tends only very slightly, if any, to move or deflect the cartridge toward any greater angle relatively to the axis $z$. The radial angle or inclination of that force-line is shown by the dotted line 30 in this view; for a fuller illustration of this feature, see Figs. 43 and 44.

Figs. 5, 6, and 7, are sectional views illustrating some of the variations which may be adopted in the form and arrangement of the body-member or wall of the magazine M. For convenience and economy of manufacture, I prefer to use a cylindrical tube as such body-member, and to have this tube of a circular form both internally and externally, and also of uniform thickness; this form is shown in Figs. 8 to 21, and in other sectional views. When the three guide-lines or bearing-paths 2, 3, and 4, are connected by or formed with such tube walls for inclosing the cartridges, and when this tube or wall has a size and location making its inner surface, (as in Figs. 1 and 8 to 21) coincide with the bearing-path 2, then a helically-located portion of such inner surface will constitute or serve as that bearing-path. Fig. 5 shows a tube, M, which is circular in section, but which does not at any point in its circumference coincide with any of the guide-line or guide-path surfaces. In Fig. 6, the bearing-paths 2, 3, and 4, are connected by the tube, M, the inner surface of which is non-circular in section, and has the tube-wall non-uniform in thickness. In Fig. 7, both the inner and outer surfaces of the tube M are non-circular in section, while the thickness is uniform. These views illustrate how the several guide-lines, or their guide-paths, 2, 3, and 4, with some suitable means for maintaining them organized and fixed together, constitute the magazine as to its operational features or functions.

Figs. 8, 9, and 10, are enlarged sectional or transverse views in positions $S^{13}$, $S^{14}$, and $S^{15}$, respectively, of Fig. 12, and show the relation of the magazine section,—or more particularly, of the helical guide-lines thereof,—to the cartridge at the head, the middle or shoulder, and the point, respectively; also the principal triangulations between the cartridge supporting faces supplied by the guide-lines, and which operate to prevent the cartridge from being deflected out of its proper position and inclination. In these views the plane of the inclined cartridge axis, 40, is vertical, as indicated by the dotted line N. Fig. $10^a$ is a similar view in which certain features of Fig. 10 are combined with others hereinafter referred to in connection with Figs. 3, $3^a$, 10, and 12.

Fig. 11 is a similar view in which the tube-sections and the cartridge circles of Figs. 8, 9, and 10, are shown combined together, and Fig. $11^a$ is a similar view showing combined together the several triangulations of Figs. 8, 9, and 10; these two figures together show how the off-set and inclined cartridge is surrounded by a system of supporting-faces arranged in triangulations and forming bearings located in transverse positions and located at three places longitudinally of the cartridge. In this preferred construction, the inner tube-surface constituting the bearing-line 2, serves to form only one side or bearing-face of the head-bearing $h^2$ (see Figs. 8, 9, and 10) and does not serve to support or guide the cartridge at any other point in its length; consequently this tube-surface, except in such guide-line portion thereof, may be varied in formation to any extent not interfering with the free movement of the cartridges.

Fig. 12 is an enlarged diagrammatic view of the magazine system, as seen from one side and in a diagonal direction, thus being substantially a perspective view. This figure shows the relations of three successive contiguous cartridges to each other, and to the magazine. The magazine tube, M, is here represented by parallel dotted lines at the lower and upper sides of the several sectional delineations of the tube, $S^{13}$ to $S^{21}$, which are reproduced in the figures which are correspondingly numbered as Figs. 13 to 21, respectively. An additional dotted section in Fig. 12 is designated $S^{16'}$, this being in advance of section $S^{13}$ by one pitch-length of the helical guide-lines. Fig. 12 illustrates the different orbital positions and the different inclinations of the successive contiguous cartridges, C, C', C'', by means of the dotted lines 2, 3, and 4, and the said sectional delineations $S^{13}$ to $S^{21}$ shows in a comprehensive and approximate manner a series of cartridges as held within the magazine by means of said excess-pitch guide-lines, and under the continuously positive control; these features are further explained in connection with other figures of the drawing. Each cartridge is thus held with both head-center, $d$, and point-center, $e$, eccentrically located relatively to the orbital axis, and with the direction of the head eccentricity transverse, (preferably at about right-angles) to the direction of the point eccentricity of the same cartridge; and with the point eccentricity of one cartridge diametrically opposite to the head eccentricity of the next and contiguous cartridge, (see Fig. $10^a$).

If a line were drawn in Fig. $10^a$ (also in Figs. 3 and $3^a$) from the point-center $e'$ of cartridge C', upwardly to the point-center of cartridge C, this line would show the line or path of direct force-transmission from $e'$ to $e$ (from $5''$ to $5'$) rearwardly through the cartridge C' in Fig. 12; to avoid confusing the drawings, such a line is omitted in these views, but is shown in Figs. 43 and 44. The place in the safe-zone $z^{10}$ (see Figs. 12, 13, 16, 19,) where the point $e$ of one cartridge will contact with the head of the next forward contiguous cartridge is designated by 5, as to cartridge C; by $5'$, as to cartridge C'; and by $5''$, as to cartridge C''. By means of the foregoing features, the cartridge is given an orbital rotation about the guide-lines axis during its movement lengthwise of the magazine and without deviation from its off-set and inclined position, and without incurring any wedging action upon the cartridge.

Figs. 13 to 56, inclusive, are views showing certain details of construction and illustrating by diagrams and comparative figures, the functional relations and mode of operation of the same; these views will now be more fully explained in connection with the features represented therein, in the following general description: Figs. 13 to 21 represent the sections $S^{13}$ to $S^{21}$, respectively, of Fig. 12, and in three groups. Figs. 13, 14, and 15, show one cartridge, C; Figs. 16, 17, and 18, show the second cartridge C'; and, Figs. 19, 20, and 21, show the third cartridge C''. These views all show the cartridges in their respective orbital positions in Fig. 12; and they, with Figs. 8, 9, and 10, illustrate how the described organization of guide-lines furnish or supply bearing-faces so located that any transverse moving of the cartridge in any direction results in halting such movement at its inception by means of some bearing-face located substantially in direct opposition to such movement.

For instance, in Figs. 13, 14, and 15, it will be seen that the cartridge C has two bearing-faces, at 2 and 4, Fig. 13, against the head; two other bearing-faces at 4 and 3, Fig. 15, at and for the cartridge point; and, in the middle position, Fig. 14, there are two bearing-faces at 3 and 4, which, as will be seen in the diagrammatic views, Figs. 8 to 11ª. are in direct opposition to the said head-bearing faces and are also in direct opposition to the two point-bearing faces. Although the cartridge may be held between the three guides or bearing-lines of the magazine in such manner as to have a slight but perfectly free lateral movement therein, yet a very slight movement of the cartridge in any direction will bring the same into touch or actual bearing upon a plurality of those faces which, (when associated together) constitute and form a cartridge-inclosing system of triangularly-disposed bearing-faces located on three helical guide-lines organized and properly circumferentially spaced therefor. When said cartridge C is shifted laterally toward the right hand at its point, as in Fig. 15, the play thereof is indicated by the clear but small space between the bearing-face at 4 and the circle $p$.

In the second group of three views, Figs. 16, 17, and 18, (corresponding to the second cartridge C' in Fig. 12) the cartridge is shown shifted in a different manner so that the play is shown in Fig. 16 at 2; in this case, the mid-bearing faces (one or both) and the point-bearing faces (one or both) come into actual contact or bearing with the cartridge, while at the head end only one of the two head-bearing faces, at 4, operates for limiting the lateral movement of the cartridges; but here, it will be seen, the direction of the pressure which this head-bearing face exerts upon the cartridge is in opposition to the combined action of the middle bearing and the point-bearing; this is more clearly shown in Fig. 11ª. In this second group, the axial-plane N' is shown (as in Fig. 3) revolved (clockwise) through three-fourths of a circle from the position of plane N in first said group; a similar further circumferential advance is shown in the third group, of the plane N'' relatively to the plane N'.

In a similar manner Figs. 19, 20, and 21 (the third group) illustrate how on a still different shifting tendency of the cartridge this is brought to bear against the two head-bearing faces at 2 and 4, Fig. 19, against one or both of the two-point-bearing faces 3 and 4, Fig. 21, while only one of the mid-bearing faces at 4, Fig. 20, operates for limiting the lateral movement which the cartridge might otherwise have. Thus in whatever direction the cartridge may be given a tendency to lateral movement, and whether this tendency to such movement exists in one direction at the head, and another direction at the point; or, whether it applies to the entire cartridge in the same direction, the action of the system is always such as to furnish a series of bearing-faces located one or more at each of the said three longitudinal positions (as $h$, $m$, and $p$) on the cartridge, and always with some one bearing-face acting in opposition to a plurality of other bearings or bearing-faces. By means of this freedom of lateral movement (but this restricted to a small amount only) the magazine is adapted for using cartridges having some variation in form and size, and also having some variation in the proportions of the respective bearing-engaging portions; so that in practice the amount of play, and the operation of the several cartridges in a series of them contained in the magazine, is made uniform and effective; and a perfectly free movement of the cartridges is secured with only a slight lateral play thereof. In practice, such "play" as here described, may be caused by a slight misalinement of the larger and smaller portions of the cartridges, which variations or defects are thus allowed and provided for by the structural features here described.

Suppose, for instance, the cartridge to lie in the magazine as indicated in Figs. 8, 9, and 10, and that some force should cause the point of the cartridge, (Fig. 10) to tend to move in the direction of the arrow 90. The location of the tangential plane 91 indicates the relation of the contacting surfaces at the bearing-face 3° on the curved supplemental guide-line 3, at or near the point $p$ of the cartridge prior to such action taking place. The line 92 represents the plane of the contacting surfaces at the middle-bearing 40 (as also shown in Fig. 9); and these two face-tangent lines 91 and 92 form an angle, 95, which normally operates to oppose the movement of the point of the cartridge in the direction of said arrow 90. The said point movement, however, carries the circle $p$ to the position, for instance, shown by dotted circle $p$, and so advances the contact from $3^c$ to the location $3^{c\prime}$, while the middle-bearing contact $4^b$ is moved rearwardly to $4^{b\prime}$; the said tangential planes being thus shifted to positions $91'$ and $92'$, and broadening the angle 95 to the angle $95'$. See also Figs. 23, 24, and 28. With this less acute angular disposition, these two guide-path faces serve to arrest any further lateral movement of the cartridge in the direction of the arrow 90 in a more direct and positive manner, and in a way to avoid the sticking or jamming of the cartridges. During the said action, (when tending to occur as here stated,) the head-bearing, as indicated in Fig. 8, operates after the manner of a fulcrum for opposing any lateral movement of the cartridge head in the direction of arrow 89, (oppositely to said arrow 90 in Fig. 10). Thus the two contacting surfaces represented by the said two converging lines 91 and 92, (although one of said surfaces is at the point and the other at the mid-bearing of the cartridge) coact in a direct manner with each other, and each co-acts with the said head-bearing, for positively preventing any movement of the point of the cartridge in the direction of the arrow 90 beyond a small amount to be provided (as elsewhere herein stated) for permitting the proper free play of the cartridges in the magazine Thus the guide-line 3 supplies at the bearing-face $3^c$ a stop or face which contacts with the point of the cartridge in such manner and direction that the tangential line indicated by 91 is located transversely of, and at nearly right-angles to, the axial plane N of the cartridge. This stop face $3^c$, therefore, operates in a particular manner in connection with the other guide-line bearing-faces as a point-movement-limiter, which prevents the cartridge-point from being shifted too far in the direction in which it is normally held by the said middle-bearing face $4^b$.

Another feature of organization shown in Fig. 8, (also in other sectional views) is the circumferential spacing of the guide-paths, 4, 3, and 2, in connection with their varying radial distances, respectively from the axis $z$. The path 2 is not diametrically opposite to the path 4, but is located at a circumferential distance therefrom which is much less than one-half of a circle. Beginning at path 4, and going in the direction of the forward axial-path curvature (clockwise in this instance) around Fig. 8 and the companion sectional views, the arc 4 to 3 (the "guide-arc") is the lesser arc of the three, being (in this instance) substantially one-fourth of a circle. The arc 3 to 2 and the arc 2 to 4, are each longer, and may be about equal to each other. Thus there are two successive arcs which are of increasing lengths, respectively, in the direction of the increasing axial-path radii. Also the direct distance between the paths 4 and 2 is less than the diameter of the head-bearing of the cartridge, whereas if those paths were about opposite to each other from the axis $z$, such direct distance would be greater than said head-bearing diameter.

Comparing Figs. 13 to 15, and these with Figs. 8, 9, and 10, it will be seen that the guide-line 4 extends around the magazine substantially two-thirds of a turn from the position it has in Figs. 13 and 8, to the position shown in Figs. 15 and 10. From Figs. 13 and 8, it will be seen that the bearing-face at $4^a$ constitutes the forward part of the head-bearing, while in Figs. 15 and 10, the same guide-line supplies the rearward bearing face at $4^c$ of the point-bearing; the latter arrangement also occurs in the mid-bearing, Figs. 14 and 11, at $4^b$.

Referring again to Fig. 8, the chord $h^2$ of head-circle $h$, extends between the head-bearing faces $2^a$ and $4^a$, and forms one side of a triangulation of which a second side $h^3$ extends from said face $2^a$ to the mid-bearing face $4^b$; and of which the third side, $h^4$, extends from the face $4^a$ to said face $4^b$, thus completing the support-angle $2^a$, $4^a$, $4^b$. Now, passing to Fig. 9, with the chord $m^2$ of the mid-bearing (this comprising the faces $3^b$, $4^b$,) as a base, one triangulation extends forwardly to the point-bearing face $3^c$, thus forming the support-angle composed of the sides $m^2$, $m^3$, and $m^4$, and extending between the bearing faces $3^b$, $4^b$, and $3^c$. From the same chord, $m^2$, another triangulation extends rearwardly to the head-bearing face $4^b$, thus forming the support-angle composed of the sides $m^2$, $m^5$, and $m^6$, and extending between the bearing faces $3^b$, $4^b$, and $4^a$. Similarly, in Fig. 10 the base line $p^2$ extends from the point-bearing face $4^c$ to the face $3^c$, while the line $p^3$, from face $4^c$ to face $4^b$, and the line $p^4$ from face $3^c$ to $4^b$, from the other sides of the support-angle $4^c$, $3^c$, $4^b$. When these four support-angles are assembled together, as in Fig. $11^a$, they cover or constitute an area or figure in and by which the cartridge-axis 40 is wholly surrounded or inclosed, thus indicating how the cartridge itself is brought under positive and complete control, so that whenever there occurs any tendency of either head or point to move laterally out of place in any direction, such incipient movement is always effectively opposed by the co-action of some plurality of those bearing faces properly located for such purpose.

The head-bearing, indicated by chord $h^2$,

Figs. 8 and 38, limits the cartridge against movement laterally of this chord in the direction of arrow $a^3$, Fig. 38, and the point-bearing, as indicated by its chord $p^2$, acts in the same way. Similarly, the mid-bearing, as indicated by its chord $m^2$, acts in a transverse direction, which is represented by arrow $a'$. Now, as already in effect set forth, these transversely-acting bearings also operate by reason of the support-angles and triangulations represented in Fig. 11$^a$ (and in the views antecedent thereto), also act in the reverse directions, as indicated by opposite arrows $a^2$ and $a^4$. Thus the described set of faces arranged in such triangulations between points on helical bearing-paths, (Fig. 37) is in one respect of a rectangular disposition, which with the triangulations forms a dual or complex system. This is further illustrated in Fig. 38, where the four general directions of those direct and reverse actions are indicated by the four arrows therein shown, while the opposition thereto is indicated by the rectangularly-disposed lines $b^1$, $b^2$, $b^3$, and $b^4$.

Fig. 22 is an end view similar to Fig. 11, but showing the magazine turned to a different position, and is drawn in alinement with the perspective view Fig. 24, and also with the side-view, Fig. 23. The line of sight in the view shown in Fig. 24 is in the direction of the arrow 27 in Fig. 23. (Fig. 24 also compares, except for rotative position and omission of the cartridge, with Fig. 45). In these views the normally clear space between the guide-line 4 and the "cylinder" 10 (see Fig. 29) intermediate to the bearing-faces 4$^a$ and 4$^b$, is shown at 18.

Fig. 28 is a representation (drawn in alinement below Fig. 23) of a part of the cartridge with the line 4 (of Fig. 23) supposed to be brought around into the plane of the axis 40, for showing the normal relation of the said bearing-path 4 and its faces at 4$^a$ and 4$^b$, to the space at 18. While the guide-line 4, by reason of its curvature, extends along and around the magazine from the point 4$^a$ at the head of the cartridge to the point 4$^b$ at the mid-bearing, and since the radius ($r^4$, Fig. 42) of this line or bearing from the orbital axis, $z$, is much less than the radius of the cylinder-portion 10 of the cartridge, it is important, for this reason among others, to give the cartridge such an inclined position as will bring the cartridge shell into permanent contactual relation with the said guide line at the head end, and at the forward end of said cylinder 10. In practice, I have found it important to make this inclination of the cartridge axis 40, in its plane N, great enough entirely to relieve said intermediate portion of the cartridge from normally having any contact with said guide-line 4. This result is accomplished by so locating and curving the main guide-line 4, and the guide-lines 2 and 3, as to positively limit the cartridge against movement toward a greater degree of inclination in the said off-set plane of its own axis. These respective locations and curvatures, and their circumferentially spacing in the magazine, are obtained by means of the features (including the point-bearing face 3$^c$) elsewhere herein more fully set forth.

Fig. 29 is a diagram illustrating the general character or formation of such cartridges as shown in other figures of the drawings. As in Fig. 1 and in the diagrammatic views, Figs. 12 and 39, the line $S^{13}$ to $S^{16'}$, indicates in this view the length of one turn or "pitch" of the helical guide-lines, or guide-paths, of the magazine. The general proportions of the cartridge are indicated by the two cylinders 10 and 10$^a$, substantially of the shape or rimless style also shown in Fig. 2, and which I designate as the two-cylinder formation. In Fig. 29, and also in Fig. 39, which is supplemental thereto, the pitch-length is shown divided into four parts at the points 7, 7', and 7'', thus dividing the pitch-length into four substantially equal divisions. In the present instance the cartridge axis 40 extends from the point $S^{13}$ to the point 7'', thus covering three of the said divisions, so that the length of the pitch is here shown equal to one and one-third times the length of the cartridge axis. Another line from $S^{13}$ to $S^{16'}$ is shown equal to the same pitch length and is divided at the points 8, 8', into three equal divisions. On this line it will be noted that the second division 8' comes substantially in line with the forward end of the point-bearing $p$, so that the length of two of these divisions, extending from $S^{13}$ to 8', is equal to two-thirds of the pitch-length and gives substantially the total length within which the bearing-supports are located whereby the cartridge is held in place against lateral movement in the magazine. This length from point $S^{13}$ to the point $S^{15}$, I designate as the "bearing-range" of guide-line 4. When the said bearing-range length $S^{13}$ to 8' is divided into three equal parts, as indicated by the lines 9, 9', (Fig. 29) it will be noted that the forward end of the mid-bearing, at M, extends forwardly on the cartridge for substantially two-thirds of the length of said bearing-range, and is about or somewhat less than one-half of the pitch-length. The proportions and ratios which are here illustrated are, of course, to be understood as appertaining and appropriate to the kind and formation of cartridge herein illustrated; and, that when these proportions and the dimensional relations between the different portions of the cartridge are modified to any considerable extent, the proportions and relative specific dimensions of the several elements comprised in this magazine system should be adjusted in their construction to a corresponding extent.

Figs. 30 and 31 illustrate certain specific features which may be adopted in the guide-lines 3 and 4. Since, during its passage along the guide-lines each bearing-location of the cartridge comes to every point in the length of its guide-line, therefore all the bearing relations as between the cartridge and the guide line occur in succession at each point in the length of the guide-line which is traveled over by the cartridge. This feature is represented in Fig. 30 as to the guide-line 4 of least radius, and in Fig. 31 as to the guide-line, 3, of medium radius. In Fig. 30 the circle $h$ shows the head of the cartridge bearing at the point $4^a$ on said guide-line 4; the circle $m$ shows the mid-bearing of the cartridge centrally upon the guide-line at $4^b$; and, the circle $p$ shows the point-bearing of the cartridge against the guide-line 4 at the point $4^c$. These three adjacent and relatively narrow surfaces or zones on the guide-lines, $4^a$, $4^b$, $4^c$, thus constitute in effect three narrow guide-paths, which, although close together, may, for some purposes, be considered as distinguished from each other by the circumstance that when the cartridge slides along in its helical course through the magazine, the head of the cartridge bears on the guide-path $4^a$, the middle of the cartridge on the guide-path $4^b$, and the point of the cartridge on the guide-path $4^c$.

In a similar manner, as shown in Fig. 31, the larger circle $m$ indicates the relation at the mid-bearing of the cartridge upon the guide-line 3 at $3^b$, and the smaller circle $p$ approximately indicates the position of the point-bearing at path $3^c$ on said guide-line 3. Thus, the guide-line surface at the point $3^b$ may be said to form the guide-path (as to the guide-line 3) for the mid-bearing, while the adjacent surface at the point $3^c$ constitutes a similar guide-path for the point-bearing of the cartridge.

Fig. 32 illustrates a feature of the guide-line 3, and one of its relations to the other guide-lines. A tangential line, as 25, Fig. 8, touching the guide-path 2 at the head-bearing $2^a$, obviously does not cut the inclusive circle $2^e$, nor form the chord of an arc thereof. But such a tangential line, as 87, Fig. 32, drawn to touch the guide-path 3 at the point-bearing $3^p$, (since this guide-path is somewhat within said circle $2^e$) will (when extended) cut said circle at $87'$ and $87''$, thus forming the chord $87'$ to $87''$ of the arc of circle $2^e$ between those points. Should the point circle $p$ be raised to the dotted position 84 in Fig. 32 (provided the guide-path 3 were removed) to touch the circle $2^e$ at the place 88, then a line tangential to such contact would lie in the position 85, with the angle 86 less than a right-angle, since the line N is off-set from the axis $z$ by the distance 42. The location, therefore, of the bearing-face $3^p$ on the chord line 87 and well within the circle $2^e$, brings this tangential line not only nearer to the axis $z$, but also substantially to a right-angle with the line N, which is the plane of the cartridge axis. (See Fig. 3).

Figs. 33, 34, and 35 are sectional views of the tube M in positions $S^{13}$, $S^{14}$, and $S^{15}$, respectively, in Fig. 12. The head-bearing $h^2$ is shown in Fig. 35; the mid-bearing, $m^2$, in Fig. 34; and, the point-bearing, $p^2$, in Fig. 33. In each of these figures the arrow shows the direction in which the bearing opposes the movement of the cartridge laterally of the tube. In these respects each bearing acts by itself as a single, or unitary cartridge support, regardless of the presence or absence of supporting surface between the ends of the chord-lines of such bearings. These views show separately the bearing chords which are shown in combination in Figs. 37 and 38, for comparison therewith.

Fig. 36 is a view similar to Figs. 11 and $11^a$, and shows certain features for comparison with Fig. 32; also, with the other diagrammatic sectional views, as elsewhere herein pointed out. The guide-lines arc L is here shown as extending (clockwise) from radial line V around to line V', thus being complemental to the arc Q which is between those radial lines.

Fig. 37 is an end-view of the cartridge, C, and shows the triangulations as they would appear when looking endwise of the axis 40. When looking lengthwise of the magazine these support-angles appear separately as shown in Figs. 8, 9, and 10; and when assembled together, as in Fig. $11^a$, they are comprised in or constitute a substantially triangular figure (see Fig. 37) which may be said to be composed of over-lapping triangular areas which substantially approximate,—when combined together,—an equilateral-triangle, between the points $3^b$, $4^a$, and $4^b$. The cartridge is thus positively controlled as against lateral movement by a triangular series or system of bearing faces which comprises supports that in each case are, respectively, located opposite to one of the sides of the said composite figure.

Fig. 38 is an end view similar to Fig. 37, but shows only the bearing-chord components of the triangulations, and is especially for comparison with Figs. 8 to $11^a$, and 32 to 37. In Fig. 8, the line $h^2$, between the guide-path faces $2^a$ and $4^a$, I designate as the chord of the head-bearing; it is (in this instance) distant from the cartridge axis 40 by the amount 61, and from the axis $z$ by the amount 61', but in some cases these distances may be varied. Similarly, in Fig. 9, the line $m^2$, between the guide-path faces $3^b$ and $4^b$ is the chord of the mid-bearing, it being the chord of that arc or portion of the circle $m$ which extends between these guide-path faces. In Fig. 10, the line $p^2$, in like manner indicates the chord of the point-bearing, which extends from the face $4^c$ to the face $3^c$. In the combined or assembled four triangulations as represented in Fig. $11^a$, those three bearings-chords, $h^2$, $m^2$, and $p^2$, are shown by heavier dotted lines; the chords $h^2$ and $p^2$ being in substantially the same directions, while the mid-bearing chord $m^2$ is located transversely at about right-angles thereto. In all the views, Figs. 8 to $11^a$, those four triangulations are represented as they appear when the line of sight is parallel to the magazine axis $z$. The triangulations shown in Fig. $11^a$ are redrawn in Fig. 37 as they are arranged when the line of sight is parallel to the axis, 40, of the cartridge; the bearing chords are distinguished, as before, by the heavier lines. In each triangulation, I have regarded the side formed of the bearing chord as the principal line or element, and these chords indicate, by their relative positions, the transverse directions, of their cartridge-controlling action. This feature is further brought out in Fig. 38, which corresponds with Fig. 37, except that only the said bearing chords (or base lines) of the triangulations are reproduced. The two chords $h^2$ and $p^2$ are here shown nearly coincident, while the chord $m^2$ is substantially at right-angles to them both.

Figs. 39, 40, 41 and 43 are diagrams illustrating how the several guide-lines or bearing-paths, while having the same helical pitch, will vary as to their actual curvatures. The three circles $2^e$, $3^e$, and $4^e$, Fig. 40, indicate the diameters of the respective geometric cylinders on the surface of which (or within which) the guide-lines 2, 3, and 4 may be said to be located. The guide-line 4 (as shown in the preceding figures) is here shown as being the bearing-line or path of minimum radius, $r^4$, (Fig. 42) which is that of circle $4^e$; and similarly as to the radii $r^2$ and $r^3$, which are the radii of the guide-lines 2 and 3 and of the circles $2^e$ and $3^e$. These several radii are also indicated in the preceding sectional views by the distances there shown between the axis $z$ and the respective guide-lines 2, 3, and 4.

Supposing, now, each of the circles $2^e$, $3^e$, and $4^e$ to be cut at 70 on the line $z$, and then unrolled or developed into a plane, we will then have the three planes $2^n$, $3^n$, and $4^n$, as shown (in end view) by the lines thus designated in Fig. 40; these lines being equal, respectively, to the circumferences of said "cylinders" (represented by circles $2^e$, $3^e$, and $4^e$) are therefore of different lengths, and so correspond to the widths of the developed surfaces $2^s$, $3^s$, and $4^s$, respectively, in Fig. 39, in which these surfaces are shown of one pitch-length, from $S^{13}$ to $S^{16\prime}$. To facilitate comparisons, this diagram shows said developed surfaces, or planes, as lying one above the other, with the narrowest one, $4^s$, at the top. The guide-line 4 being now developed and properly plotted on the surface $4^s$, it becomes the diagonally-disposed line or path $4^t$, beginning at $4^h$ and extending on the same angle or pitch to the bearing-line $4^m$ and $4^p$. Similarly, the guide-line 3 when thus plotted on the surface $3^s$, becomes the diagonal line $3^t$; and the guide-line 2 becomes, on surface $2^s$, the similar line $2^t$. Each of these three lines extends the whole width as well as the whole length of its said respective surface, and since these surfaces are of one length but of different widths, the angularity of said lines varies accordingly, and thus visually represents the variations in the relative curvatures of the guide-path surface as combined together in the completed magazine, see Figs. 1 and 12. For aiding these comparisons in such a given instance as here illustrated, I have drawn such a cartridge at C, over the lines of the diagram in Fig. 39, and on the same scale therewith and also in the proper offset position of its axis 40 relatively to axis $z$. On the several angular lines, $2^t$, $3^t$ and $4^t$, I have approximately located the bearing-faces and their ranges which are supplied by and on the guide-lines for supporting one cartridge while in the position here shown; viz;—three faces, $4^h$, $4^m$, $4^p$ on the line $4^t$; two faces, $3^m$, $3^p$, on the line $3^t$; and one face, $2^h$, on the line $2^t$. By comparison it will be seen how the circumferential range of the said faces on line $4^t$ added to the circumferential range of the said faces on line $3^t$, extends substantially completely around the magazine; and how the lengths of these two bearing-ranges, (these lengths being approximately indicated by the distance $4^h$ to $4^p$) when added together would be substantially as great as the length of the guide-line pitch $S^{13}$ to $S^{16\prime}$, in Figs. 12, 29 and 39, and especially when the aforesaid excess-pitch is not more than one and one-third and not less than one and one-fourth times the length of the cartridge axis 40.

Fig. 42 is a diagram drawn in alinement with and at the right-hand of Fig. 40, to better facilitate comparison and shows the radii of the three guide-lines, and the radii of the head-bearing, mid-bearing, and point-bearing, surfaces on a cartridge having the described two-cylinder formation but having (as specifically indicated by the lines in Figs. 2, 12, 23 and 24) the larger cylinder portion, 10, of a slightly tapering shape or style in accordance with the practice now generally adopted in manufacturing this class of cartridges. In this view, $r^2$ indicates the radius herein adopted for guide-line 2; $r^3$, the radius of guide-line 3; and, $r^4$ the radius of guide-line 4. In similar order, $c^2$ indicates the radius of the circle $h$ of the head of the cartridge C; $c^3$, of the mid-bearing $m$; and $c^4$ of the point-bearing $p$. This latter radius may (in some cases, as in this instance), correspond to or even be slightly larger than the said radius $r^4$.

Figs. 43 and 44 are diagrammatic end and side views, respectively, showing the manner in which the cartridge axes extend through their respective axial-arcs, circumferentially, of the magazine axis, and how the planes of these axes are arranged tangentially to a geometric cylinder which has a diameter greater than the radial inclination of those axes relatively to the orbital axis $z$. These views also illustrate the locations of the force-lines by which the pressure of a magazine spring applied to one cartridge is transmitted backwardly through a series of the cartridges. In Fig. 44 the length of the cartridges corresponds in scale to Figs. 1 and 2, while the diameters are increased to the scale used in Figs. 8 to 11$^a$. In this system, the cartridge axes are not located or inclined in planes which are disposed radially to the orbital axis, but are, on the contrary, located in axial-planes which are tangential to a geometric cylinder concentric with said axis. This is indicated in Fig. 3$^a$, where the circle $z^7$ is the end view of this geometric figure, and in Figs. 43 and 44, I have shown the same cylinder with the axes 40, 40', and 40'' laid thereon, while in their proper relative positions to each other. In Fig. 43, the axial-line 40 shows the location in end view of the plane of the axis 40, while the line 30 similarly shows the plane of the force-line 30, this plane being transverse, at about right-angles, to said axial plane; these relative positions are further indicated in Fig. 44, which shows the axis 40 and the force-line 30 of any one cartridge located in adjoining quadrants. These views by comparison with Fig. 45 and Fig. 46 indicate how the axes of the cartridges are disposed tangentially to a geometric cylinder, $z^7$, having a diameter substantially three-fourths of the inclination of said axes in their axial planes; this proportion, therefore, substantially corresponds in this instance to the ratio of cartridge-length to pitch-length, as adopted in the drawings. But comparison with Fig. 4$^a$, shows the cylinder $z^7$ to be much larger than the entire radial inclination of said axis 40. It is evident the line of force transmission will pass through any one cartridge directly from the point-contact to the head-contact thereof which head-contact is, however, the point of the next preceding cartridge. For instance, in the cartridge C' this force-line, 30', extends from $e'$ backward to $e$. But $e$ is one-half a revolution from $d'$ of axial-line 40', so $d'$ is opposite $e$.

The direction of the rearward thrust by cartridge C'', backward through cartridge C' and against cartridge C, (Figs. 10$^a$ and 12), is in the line 30'. The deflective-action of this thrust, as to the point of cartridge C, is to force this point directly toward the transversely-disposed bearing-face 3$^c$ from which the re-action line, $m^4$, (see Figs. 9, 10, and 10$^a$) is directly to, and in a plane vertically to, the mid-bearing face 4$^d$, so that such action is limited by and against faces so transversely disposed as to prevent wedging action. The lines of thrust, as 30', represents the line of transmission of the pressure from one cartridge, C'', backward through cartridge C' to the point of cartridge C,—C'' presses at 5'' against the point $e'$ of C', and the force-line 30' reaches direct through C' back to the point $e$ of C. This brings force-line 30' at S$^{18}$, directly to $e$ and opposite to $d$; thus the line 30' of cartridge C' lies in the quadrant Q next in advance of axis 40'; so the lines 30, 30', 30'' and 30''' extend around the circle in a direction opposite to the helical guide-lines, and in an unbroken line of transmission of which the said component lines are located nearly in the axial planes, respectively, of the next rearward cartridge axes, and thus entirely encircle the magazine axis. The two lines 40' and 30' therefore form two sides of a triangle having the diametrical line $e$ $d'$ as its base-line; and as this base line is about central of the magazine circle, while the point, $e''$, is at the radial distance $z$ $e'$, the plane of this triangle $d$, $e$, $e'$, is inclined by that angle to the axis $z$; and these successive triangle-planes are in transverse positions; and the plane of this force-line of one cartridge is transverse to the plane of the axis of the same cartridge.

Fig. 45 is an illustrative view similar in position and perspective to Fig. 24, but with the magazine turned to bring the cartridge axis 40 above the orbital axis $z$. This view shows how said axis 40, beginning (as in section S$^{13}$, Fig. 12), at the radial line V' (at the radial distance $z^4$, Fig. 3$^a$, of the head-center, $d$, of the cartridge from said axis $z$), extends circumferentially around said axis $z$,—and also longitudinally thereof,—to the point $e$ on the radial line V, corresponding to section S$^{16}$ in Fig. 12. In traversing this distance, said axis 40 although itself a straight line, extends circumferentially of the magazine (and around the axis $z$ thereof), through the arc represented by said radial lines V' to V; this is the arc which is designated by Q in the diagrams, Figs. 3 and 3$^a$. This arc, Q, I term the axial-arc. To further show the relations of the divergent axial-line and force-line, the latter line is shown at 30, in Fig. 45, and Fig. 46, particularly for comparison with Figs. 4$^a$, 43 and 44. The line 30 has a circumferential advance, in this instance, equal to that of axis 40, or through one quadrant; but the successive force-lines join (see Fig. 44) to form a continuous line surrounding the orbital axis.

Fig. 46 is drawn in alinement with and below Fig. 45, and shows the lines at $S^{13}$ (Fig. 45) as seen in end-view, with the axial-arc Q extending from the radial line V′ to the radial line V, (also see Figs. 3, 3ª, 8 to 11ª, and 36). In this figure the radial lines $k^3$ and $k^4$ show the positions at said section or position $S^{13}$ of the guide-lines, or paths, 3 and 4, respectively, and the circumferential advance of one relatively to the other is indicated by the arc $g$, which I designate the guide-arc. The arc $g$ is here shown located directly oppositely to the radius V′, while the axial-arc, Q, has its middle line, (coincident with line $z$, Fig. 45, extended), at substantially right-angles to the radial line $k^4$, of guide-line 4; the circumferential position of guide-line 4 is thus indicated as being one-fourth of a revolution, or circle, in advance (clockwise of the circle) of said axial-arc Q. In Fig. 46 the line $h^2$ shows the approximate position of the head-bearing chord, to facilitate comparison with the preceding and following diagrams, especially Figs. 8 and 11, and with Figs. 51 and 52.

Figs. 47 to 50 are views similar to Fig. 46, and are drawn in alinement therewith, for illustrating the circumferential advance of the guide-arc $g$ relatively to the axial-arc Q, at successive positions (in Fig. 45) between the position at $S^{13}$ (shown in Fig. 46) and the position at $S^{16}$, shown in Fig. 50. Figs. 47 and 48 represent, respectively, such positions at about the rearward and forward limits of the mid-bearing contacts on the guide-lines, as indicated for instance by the dotted lines at $m$, Fig. 2; these limits correspond nearly with the lines at $4^b$ and $4^{b'}$, Figs. 23, 24, and 28, and with the approximate contact-range indicated at $4^m$ and $3^m$, Fig. 39. In Figs. 47 and 48 the position, (the average position) of the guide-arc, $g$, is crosswise of, at about right-angles to, that of the axial-arc Q. Similarly, Fig. 49 illustrates the relative arc positions at about the middle of the limits of the point-bearing; these being indicated by the dotted lines at $p$, Fig. 2, and corresponding nearly with the locations defined by $3^c$ and $3^{c'}$, Figs. 23 and 24, and with the contact-range indicated at $3^p$ and $4^p$, Fig. 39. Fig. 49 shows the arc $g$ advanced a short distance beyond (to the right-hand) of arc Q, and substantially one-fourth of a circle from its position in Fig. 48. In Fig. 50 the arc $g$ is shown revolved through three-fourths of a circle from its position in Fig. 46; this brings guide-line 3 to the position in Fig. 50, of guide-line 4 in Fig. 46, and brings guide-line 4 about centrally of arc Q, as in the transverse plane at $S^{16}$ at the extreme forward end, $e$, of the cartridge axis, which is indicated in previous views and in the case of a pointed bullet is some distance forward of said point-bearing $p$. Through these proportionate guide-arc advances, the successive bearings are obtained as shown in Figs. 8, 9, and 10, together with the peculiarly important result of bringing the bearing-face $3^c$ into the location and tangential position on line 91 already described, (as shown in Fig. 10), in connection with the system of triangulations, Figs. 8 to 11ª. In this instance, the axial arc Q is drawn about the one-fourth part of a circle, and corresponds to a complemental guide-arc of three-fourths of a circle, which is between two-thirds and four-fifths, and which I deem to be the extremes of practicable limits of variation in the guide-lines' pitch. The cartridge axis, therefore, being so far off-set, may be said to extend around the orbital axis $z$ through one-fourth of a revolution, or circle. In practice I find the circumferential guide-arc L of the guide-line 4 should be not less than two-thirds of a revolution, and that the complemental arc (as V, V′,) should not be more than one third of a circle; these two arcs added together being substantially as great as one complete circle; but I prefer this ratio of said two arcs to be substantially one-to-three, and have therefore adopted this specific ratio in the accompanying drawings.

If the guide-arc $g$ be considered as passing along the cartridge C while this is at rest, said arc may be said to revolve around the axis $z$ and relatively to the axial-arc Q, in the direction, of course, of the helices; and when the pitch is one and one-third times the cartridge-length, to make three-fourths of a turn in passing along from the head-bearing to the point of the cartridge. The successive positions shown in Figs. 46, 48, and 49, are also indicated in Figs. 8, 9, and 10, respectively.

By the off-setting of the plane N of the axis 40, and at the same time making the helical pitch (guide-line pitch) much longer than that axis, the circumferential arc V′, V, (arc Q) occupied by said axis may be made so small that this axial-arc added to the circumferential arc (guide-lines arc,) occupied by one cartridge-length of one guide-line will substantially equal one revolution, or circle, and these two arcs thus become complemental. But if the plane N should not be so off-set, but be located in or close to the axis $z$, the axis-arc Q would be substantially one-half of a circle, and this combined with a guide-arc of substantially one full circle,—as when the guide-line pitch is the length of the cartridge,—would give a combined arc of about one and one-half times a full circle, and this would result in too great a curvature of the guide-paths, and in such radially different relations of the tangential planes for the bearing-faces and of the triangulations as to produce wedging action, and render the magazine unreliable and impracticable; but in such a case the said arcs would not be complemental. These obstacles are effectively overcome in and by my present invention.

When the orbital-advance of one cartridge is three-fourths of a revolution in passing from the position C to the position C', Fig. 12, and when the axial-arc of advance is one-fourth of a revolution, this latter arc subtracted from that orbital-arc (or guide-lines' arc) gives one-half of a revolution as the net or relative angular advance; this brings the head-center $d'$ of the cartridge C', and the point-center $e$ of the cartridge at C, directly opposite to each other from their orbital axis $z$, which is then on a line directly between those two centers, as shown in Fig. 10$^a$. The angular advance, therefore, of the helical guide-paths over the angular advance of the cartridge axis is in that case one-half of a revolution in one cartridge-length of the magazine; and, the arc, as $g$, Figs. 46 to 50, of the head-center $d'$ in circumferential advance of the point-center $e$, is equal to the said guide-arc minus the said axial-arc.

Another feature of the organization and operation of this magazine is the relation between the axial-arc and the guide-arc, whereby the latter, in the distance from the head-bearing to the point of the cartridge, has a circumferential advance which at the several bearing-places on the cartridge brings said arcs to successive relative locations which are distinctly different from each other, and which have, each in its place, particular functional relations to and in cooperation with the other bearings; these relations and results are shown in the drawings and set forth in the following description of Figs. 51 to 56.

Fig. 51 shows in longitudinal section a short portion of the magazine M with the head portion, $h$, of the cartridge located in proper position therein (see section S$^{13}$, Fig. 12); and, Fig. 52 is an end elevation as seen from the left-hand in Fig. 51, and arranged for comparison therewith. Figs. 53 and 54 are a like pair of views similarly showing the middle-portion of the cartridge, $m$, in proper relation to the bearing-paths 3 and 4; this portion $m$ comprises the adjacent parts of each of the cylinders 10 and 10$^a$, of the cartridge-formation illustrated in Figs. 2, 23, 29, and 39. Figs. 55 and 56 are a similar pair of views for showing the point portion, $p$, of the cartridge in position relatively to the same bearing-paths. Figs. 51, 53, and 55 are drawn on the same axial line $z$, but the several portions of the magazine shown in these views, respectively, are supposed to be turned on said axis to bring the bearing-chords, $h^2$, in Fig. 52; $m^2$, in Fig. 54; and, $p^2$ in Fig. 56, all into a vertical position. (Compare with sections S$^{13}$, S$^{14}$, and S$^{15}$, Fig. 12). This brings the line of sight in Figs. 51, 53, and 55, directly toward or vertical to those bearing-chords, as indicated in the companion views, Figs. 52, 54, and 56, respectively; this direction is opposite to the arrows in Figs. 33, 34, and 35, respectively. Fig. 51 shows the chord $h^2$ at right-angles to the cartridge axis 40, and substantially (nearly) at right-angles to orbital axis $z$. Fig. 53 shows the chord $m^2$ in a slightly modified angular position as compared with chord $h^2$. But in Fig. 55 the relative inclination of the chord, $p^2$, is materially increased, thereby making this point-bearing chord of about the length of said chord $m^2$ of the mid-bearing. It will now become evident how the two helical guide-lines, 3 and 4, although of the same circumferential distance apart throughout their length, may be so organized (in connection with the off-setting of the plane of the cartridge axis, and the inclination of the cartridge axis in such plane), as to supply bearing-faces forming a mid-bearing on a part of the cartridge which is of relative large size, (cylinder 10) and also supply at other places thereon, bearing-faces forming the point-bearing for a part of the cartridge which is relatively of smaller size (cylinder 10$^a$); so that the middle-bearing and the point-bearing are of substantially the same chord-length and are both properly located for effective operation, notwithstanding the great differences in those parts of the cartridge and the uniformity in angular spacing and in pitch of the said guide-lines.

The particular class of cartridges, for the holding of which my improved magazine is more especially intended, I have herein designated as two-cylinder, since the larger and longer portion 10 is usually substantially, or very nearly, a cylinder, from one end of which extends the smaller end portion, 10$^a$, which is in the nature of a second cylinder formed as an extension of the first and larger one. In practice these cylinders, especially the larger one 10, (see Figs. 2, 29, and 39) are generally made slightly tapering so that the mid-bearing portion $m$, is of a slightly smaller size than the head-bearing portion, $h$. From the small cylinder 10$^a$, extends the usual bullet point, as shown, thus completing the length of the cartridge and its axis, and so fixing (in any given case) the length of the axial plane, as S$^{13}$ to S$^{16}$, Figs. 4 and 39.

In the diagrammatic view, Fig. 29, I have indicated in connection with the outline representation of the said larger cylinder 10 and the smaller cylinder 10$^a$, (which together indicate the general proportion of the cartridge) certain lines for representing some of the relations between a cartridge of that type and proportion in connection with the cartridge-holding and guiding means with which the magazine is provided. The length of one turn of the helical bearing-lines (as 2, 3, and 4, Fig. 12) extends from point S$^{13}$ to the point S$^{16}$, this distance being designated as the pitch of the guide-lines, or bearing-lines, of the magazine. In order to bring the axial plane of one cartridge to about right-angles to the plane of an adjacent contiguous cartridge (see Fig. 3), this guide-line pitch I prefer to make substantially one and one-third times the length of the cartridge axis 40. Comparing these several distances in said Figs. 29 and 39 with the locations of the several bearing-places as $h$, $m$, and $p$, for the head, the middle, and the point, respectively, it will be observed that the distance S$^{13}$ to 8′ (Fig. 29) extending over the whole length or range of the bearing-supports, is substantially two-thirds of the length of the pitch. When these relations are considered in connection with the manner in which the several guide-lines supply bearing places for the cartridge at the head, the mid-portion, and the point-portion, respectively, it will be observed that the main guide-line 4 which furnishes the bearing-face 4$^a$ for the head-bearing, also furnishes the bearing-face 4$^b$ for the mid-bearing, and that the circumferential distance between these two bearing-faces is nearly one-half of one revolution; and, that the circumferential distance between the said head-bearing face 4$^a$ and the bearing-face 4$^c$ which forms part of the point-bearing is substantially two-thirds of one revolution or circle of the magazine.

In Fig. 3 and in Figs. 8 to 11$^a$, the plane N of axis 40 of cartridge C, is shown located or off-set toward one side of the magazine and of the axis $z$, which thus becomes an orbital axis around which the said axial plane rotates during the movement of the cartridge along and between suitable helical guide-lines, such, for instance, as 2, 3, and 4. When a cartridge is so located, all its circles (transverse sections) will evidently be located eccentrically to the magazine tube, when this tube is concentric (on its inner surface) to the orbital axis $z$; and each of such cartridge circles, or sections, will be continuously maintained in one and the same relation to and distance from that orbital axis, not only while the cartridges are at rest in the magazine, but also during their longitudinal movement therein. These results so far as I am aware have not heretofore been accomplished in or by any tubular cartridge magazine for holding center-fire cartridges in end-to-end safe positions. This organization of the guide bearings in the described three locations in the length of the cartridge, together with the circumferential relations of these bearings to each other and to the cartridge, furnishes in practice an effective means for positively controlling the successive cartridges in their proper and "safe" positions relatively to each other, while permitting a sufficiently free play of each cartridge within the small limits of lateral movement needed for preventing any jamming or sticking, whether this should tend to occur as a result of the normal end-pressure of the cartridges on each other (due to the usual magazine spring), or from the concussion and recoil of the fire-arm; or, from the impact incident to the rapid operation of the loading mechanism, which, it should be noted, may involve the longitudinal movement in the magazine of the series of cartridges through the distance of nearly one cartridge-length within a period of time not more than one-fifth of a second.

In the head-bearing, presuming that we advance along the magazine in the direction of the twist or curvature, the bearing face 4$^a$ of least radius is in advance of the companion bearing face 2$^a$, which is supplied by the bearing-line 2 of maximum radius. Advancing along the cartridge, in the direction indicated, to the mid-bearing, here the said main bearing line 4 supplies the rearward bearing-face 4$^b$, while the companion face 3$^b$ of this mid-bearing is supplied by the bearing-line 3, which is of medium radius. Similarly advancing to the point-bearing position, Fig. 10, here also said main bearing-line 4 supplies the rearward bearing-face 4$^c$ for the point-bearing, the companion bearing-face, 3$^c$, being supplied by the said bearing-line 3 of medium radius. Thus the said bearing-line of least radius, 4, supplies one bearing-face for each of the said three bearings, respectively, while the bearing-line 3 supplies two of the said bearing-faces, for the mid-bearing and the point-bearing, respectively. Thus, of the series of six available bearing-faces on the three bearing-lines respectively, there are three bearing-points or faces on the bearing-line 4 of minimum radius; two on the bearing-line 3 of medium radius, and only one on the bearing line 2, of maximum radius.

For accomplishing the positive and continuous control of the cartridge throughout the whole length of the magazine, the three helical guide-surfaces or bearing-paths 2, 3, and 4, are shown as having a pitch which is so largely in excess of the length of the cartridge (see Figs. 1, 12, 39, and others) that when these bearing-lines are suitably located circumferentially of the magazine, the bearings 2 and 4 operate together substantially as one bearing, (Fig. 8) for locating the head end of the cartridge, while the bearings 3 and 4, Fig. 10, similarly coöperate to locate the point end thereof. For shifting or off-setting the cartridge to rest properly in or between or against those four bearing-surfaces or faces, I so proportion or arrange their radii and the said helical pitch as to bring the guide-line 4 into position for a part thereof to constitute a mid-bearing so located in opposition to the head-bearing and point-bearing as to thereby (and through the coöperation of all these bearings,) shift the plane N of the cartridge axis 40 to one side of the magazine axis $z$, and to also positively hold the cartridge inclined in the plane of its own axis.

The guide-line 4 is herein designated as the main guide-line or bearing-path, because it furnishes cartridge-locating bearing-faces at three places (as $h, m, p$, Fig. 29) for and on the same cartridge, one at the head, one at the point, and the other at a place which is intermediate longitudinally of the cartridge and circumferentially of the magazine, relatively to the said head-bearing and point-bearing.

In Fig. 8, the head-bearing (considered as a whole) is illustrated as extending from the point, or bearing-face $2^a$ to the bearing-face $4^a$; these two points being joined by the line $h^2$ (which is shown as a chord of the arc $2^a$, $4^a$ of the head-circle $h$,) it is evident that the resistance afforded by the head-bearing to the movement of the head toward the left-hand, will be transverse to said chord, and about in the direction of arrow 89. This feature is further indicated by the lines 25 and 26, drawn tangential to the circle $h$ at the points $2^a$ and $4^a$, respectively, and which form an angle which is sufficiently obtuse to prevent the head $h$ from sticking on or between those bearing-faces. By making the inner tube-circle at $2^a$ of a size (see radius $r^2$, Fig. 42) materially larger than the diameter of the cartridge head added to the height of guide-line 4, the said head $h$ can then be off-set so far from the magazine axis $z$ as to bring the tangential planes 25 and 26 of the two head-bearings on guide-lines 2 and 4, into the desired obtuse angle.

In Fig. 12 the end-to-end safe position of the successive cartridges is more fully shown, with the point of each cartridge held at such a radial distance from the orbital-axis $z$, as will always keep said cartridge point within the annular safe-zone of the head of the next successive contiguous cartridge; this zone is indicated by the dotted circles at $z^{10}$, Figs. 13, 16, and 19.

The magazine tube M is large enough to permit the head of each cartridge to be located eccentrically therein, and at such a radial distance, (as $z^4$, Fig. $10^a$) from the orbital axis $z$, that the cartridge axis 40 lies substantially within one quadrant, Q, (as Q, Fig. $3^a$) of an inclusive circle, which, as I have herein shown, may be the inner surface of the tube M, when this is circular in section, as in Figs. 8 to $11^a$. This arrangement corresponds with that of the axial planes of the successive cartridges, as I have more particularly explained in connection with Fig. 3, which shows two such planes, N and N', located at substantially right-angles to each other, and each located at a large angle to the direct line between the head-center, $d'$, and the point-center, $e$, of two contacting cartridges, as C and C'. One object of this arrangement (illustrated in Figs. $3^a$ and $10^a$) is to bring the point-center $e$ and the head center $d'$ of contiguous cartridges to a substantially straight line, as line V, V'', which extends through or near to the said orbital axis $z$, and to do this while the said axial planes are located transversely of each other and are also at a substantial distance, as $4^z$, $42'$, to one side of said axis $z$.

In practice, I prefer to adopt such specific ratios and dimensions in respect to the details herein set forth, that the radial distance of the head-center orbit $z^2$ (Fig. $3^a$) will equal or closely approximate one-half of the height of the inclination of the axis 40 in the plane N of said axis; and, it will be observed that this apparent height of said axial inclination corresponds to the full length of the axis 40, as seen when looking endwise of the magazine, as illustrated, for instance, in Figs. 3, $10^{a''}$, and 11. I have found these ratios practical and effective when using cartridges of the style and proportions illustrated in Figs. 2 and 29; for cartridges of modified proportions, of course the minor features of the magazine should be adjusted thereto.

In Fig. $3^a$ the arrangement of the position-angles 45, 45', (as seen in end view of the magazine, as in Fig. 3), is shown in connection with the line V, V'' and line V', V''' which cross at the orbital axis $z$ of the magazine. These lines divide the magazine circle into four quadrants, Q, Q', Q'', and Q''', which are the axial-arcs of the four cartridges, C, C', C'', and C''', Fig. 1; also, see Figs. 12, 43, and 44. The orbit of the head-center, $d$, is here indicated (as in some other views) by the circle $z^2$, and the orbit of the point-center $c$ is indicated by the circle $z^3$. The lines 40 and 40' represent the inclined axes of the cartridges C and C'. See Figs. 1, 4, 12 and 24. The line 40 is here the hypotenuse of the right-angled triangle 45, the vertical side of which, $z$ to $e$, is a part of the line V, V'', and the base of which, $z$ to $d$, is a part of the line V', V'''; similarly the line 40' is the hypotenuse of the similar triangle 45', the vertical side of which, $z$ to $e'$, is on the line V', V''', and its base, $z$ to $d'$, on the line V, V''. In each of these cases it will be noted that the base of the triangle is the radial distance $z^4$ of the orbit $z^2$, while the height of the triangle is the radius of the orbit $z^3$; said base line is substantially one-half the length of the hypotenuse, 40, and the off-set direct distance between axis $z$ and the plane of axis 40, is substantially (nearly) one-half of the inclination in said plane of the bearing-range portion of the length of axis 40. (See also Fig. 29.) This is due, it is evident, to the transverse or right-angular positions of the lines 40 and 40', and to the distance by which the planes of said axes are off-set from magazine axis $z$. These two axial lines, (omitting the other parts to the said two triangles) are shown in Fig. 10ª, with a dotted line 12 extending from the point-center of cartridge C, through the axis $z$, to the head-center of cartridge C'; this line 12 is thus located in an angular position relatively to the axial planes of both of the axes 40, 40'.

Referring again to Fig. 10ª, if we suppose, for illustration, that the dotted line 12 should lie in the plane of the axis of a cartridge, and be located centrally of the magazine, then the circle, here indicated by C, would show the position of the point of a cartridge, while the circle indicated by C', would show the position of the head of the same cartridge, and it is evident that in such a case the length of said dotted line 12 would represent the inclination of the cartridge axis in the plane of its own axis, and that this distance is much greater than of the line 40. By a comparison of this figure with Figs. 3, 11, and 36, for instance, and noting the extent to which the said small circle projects outwardly from the said larger circle, the great increase of the parallelism between the cartridge and the magazine axis which is secured by means of the magazine construction herein set forth, will be evident. In supposing that the two circles referred to in Fig. 10ª might represent the head-bearing and point-bearing, respectively, of a cartridge having the said increased axial inclination in the plane of line 12, it at once becomes evident, on noting the locations of the guide-line 4, that the extent to which this guide-line projects inwardly from the magazine tube would render the magazine inoperative for the holding of such a cartridge in such a central position. And, by comparing these features as here indicated with the other sectional views, especially with Figs. 8, 9, 10, and 11, it will now be evident how the off-setting of the planes of the axes, when these are located in transverse positions and the helical pitch is substantially longer than the cartridge,— that said guide-line 4 becomes capable of supplying the desired bearing-faces for the head-bearing, the mid-bearing, and the point-bearing, and at the same time providing these faces in locations which are in opposition to other bearing-faces, whereby the cartridge as a whole may be continuously maintained at the said minimum inclination in the plane of its own axis, and with this plane off-set from the magazine axis, and this positive control be maintained regardless of gravity or the changing position of the fire-arm.

One advantageous result of making the pitch-length so largely in excess of the cartridge-length is to make the guide-path curvature so small that in practice it is found to offer no material frictional or other resistance to the proper operation of the magazine spring.

One feature of the construction illustrated in the drawings, and particularly related to the adaptation of the magazine for certain specific proportions of cartridges having the described two-cylinder formation, is the reduction of the radius of the main guide-line 4 to a distance about equal to or smaller than the radius of the small cylinder of such cartridge formation. This specific feature may be omitted or modified in certain cases, especially where the cartridge is of considerably different proportions than those which have been chosen in the present instance for illustrating my present invention.

By reason of the three helical guide-lines 2, 3, and 4, each having a similar pitch but different curvatures, and being arranged about a common guide-lines' axis, $z$, and distant radially therefrom by radii of different distances respectively, (as $r^2$, $r^3$ and $r^4$, Fig. 42), and since these guide-lines with their respective radii are so located relatively to each other that the guide-line of maximum radius (2) is opposite to and between two guide-lines of lesser radii, (3, 4,) the said series of guide-lines are brought into such an organization, as illustrated in the several diagrammatic views, as to constitute bearing-faces at two places (as 2ª and 4ª, Fig. 8) for the head and at two other places (as 3ᶜ and 4ᶜ, Fig. 10) for the point of the cartridge, and at a place intermediate longitudinally and circumferentially thereto to have on the guide-line of least radius a bearing (as 4ᵇ) for the middle part of the cartridge; and this middle bearing being located in opposition to the said head-bearing and also to the said point-bearing, the result is to hold the cartridge in a positively-determined inclined position in the plane of its own axis, (see Figs. 1, 4, and 12) as well as to locate this plane to one side of the said guide-lines' axis, so that when the cartridge is moved lengthwise of and within the magazine it is given an orbital rotation about said guide-lines' axis, $z$, and is at the same time continuously maintained in its proper axial relations thereto, as required for positively maintaining the point contact of one cartridge within the safe-zone on the head of the next cartridge.

The two helical guide-lines, 3 and 4, (see Figs 39–42) when having a pitch substantially in excess of the cartridge-length, and when located at different radial distances, respectively, from a common axis, serve to supply a system of cartridge supporting faces located at intervals around the circle of, and longitudinally of the magazine; and thus, of these guide-lines, one of them is arranged to furnish a relatively long bearing-range extending in the present instance from the head to near the point of the cartridge, while the other said bearing-line furnishes a relatively shorter bearing-range, and these bearing-ranges are so curved and located that when taken together they extend around the circle of the magazine.

The point-movement-limiter guide-path, (as 3) is thus located in one circumferential direction in the magazine circle, substantially three-fourths of a circle from the said main guide-line; the length of the cartridge is substantially three-fourths the length of the helical pitch; and, the radius of said main-guide line is about three-fourths of the radius of said guide-path which forms the point-movement-limiter. Thus in the specific construction selected for illustration herein, there exists a triple set of ratios which are substantially the same, viz; one relating to the longitudinal proportion of pitch and cartridge-length; one relating to the circumferential arcs between the supplemental guide-line and the main guide-line; and, one relating to the radii of these two guide-lines or bearing-paths from a common axis which is also the axis of the magazine and the orbital axis about which the cartridges revolve during their movement longitudinally within the magazine. It should, however, be understood that in some cases, one or more of these three ratios may be slightly increased or diminished, especially when the proportions are somewhat modified of the approximately cylindrical members 10, and 10ª, Fig. 29, which, taken together, I have designated as the two-cylinder formation of the center-fire cartridges.

The described arrangement of the bearing chords may be considered as constituting a rectangularly-disposed set of cartridge-holding faces, supplied by and on the series of helical guide-paths, and operating to limit the cartridge, both at the head and point thereof, against displacement in any direction lateral thereto. But these faces when thus arranged or disposed, comprise or include the series or system of triangulations made up of the four triangles or support-angles which are illustrated in Figs. 11ª and 37. Thus the cartridge-control is effected by guide-paths helical in form and of such an excess-pitch and curvature relatively to the cartridge-length, and which are so disposed or located both radially and circumferentially of the magazine, that the cartridge-holding faces acting on the off-set and inclined cartridge at any position thereof lengthwise of and within the magazine, operate by a complex or dual system or arrangement which in certain respects is substantially rectangular, and in other respects is of a triangular character or composition.

The course and locations of the successive cartridge axes along the length of the magazine, as indicated in Figs. 1 and 12, is partially indicated in Figs. 24 and 45, but most fully shown in Fig. 44. In following along said axes forwardly (toward the right-hand) compare Figs. 43 and 44, which show the orbital lines with an exaggerated diameter in proportion to the length of the axes. Beginning at $d$, follow along the line 40 to the point $e$, then go across the diameter to the point $d'$ and follow along the line 40' to the point $e'$; then go diametrically across to the point $d''$ and follow along the axis 40'' to the point $e''$; thence follow diametrically across to the point $d'''$ and then forwardly again on the axis 40''' of the fourth cartridge $C'''$. By carefully following out this course on Fig. 43, the peculiar mode by which the cartridge axes encircle the geometric cylinder, $z^7$, will be understood.

Having thus described my invention, I claim:—

1. The improved tubular cartridge magazine herein described, it consisting of a tube having two helical cartridge-guiding paths extending inwardly from the tube-wall and located at different points circumferentially of the tube.

2. The improved cartridge magazine herein described, it consisting of a tubular member adapted on its inner surface to form a supporting guide-path for the head of a cartridge, and having two helical additional guide-lines located at different points circumferentially of the tube and at different radii, respectively, from the axis of the tube.

3. In a cartridge magazine, the combination with the tube having a portion of its inner surface adapted for use as one guide-line for a cartridge, of two additional guide-lines each of lesser radius and located one of them circumferentially of the magazine substantially one-fourth of a circle in advance of the other, and both having a pitch in excess of the length of the cartridges to be held in the magazine.

4. As an improvement in tubular cartridge magazines, a tube having three helical cartridge-guiding paths located at different points circumferentially of the tube and at three radial distances, respectively, from the axis of the magazine.

5. In a cartridge magazine of the class herein described, the combination with a tube, as M, having one portion of its inner surface adapted for supporting the head of an axially inclined off-set cartridge, of two additional guide-lines having a helical pitch in excess of the length of the cartridges to be held in the magazine, and located one of them between one-fifth and one-third of a circle in advance of the other, and both constituting bearing-faces for the forward portion of the cartridge.

6. In a cartridge magazine of the class herein described, the combination with a tube, as M, having one portion of its inner surface adapted for supporting the head of an axially inclined off-set cartridge, of two additional guide-lines having a helical pitch of substantially one and one-third times the length of the cartridges to be held in the magazine, and located one of them between one-fifth and one-third of a circle in advance of the other, and both constituting bearing-faces for the forward portion of the cartridge.

7. As an improvement in tubular cartridge magazines, a tube having three helical cartridge-guiding paths located at three different radial distances, respectively from the axis of the magazine and all having a pitch in excess of the length of the cartridges to be held in the magazine, and having the guide-path of maximum radius located in circumferential advance of the guide-path of medium radius; and the guide-path of medium radius in circumferential advance of the guide-path of minimum radius.

8. As an improvement in tubular cartridge magazines, a tube having three helical cartridge-guiding paths located at three different radial distances, respectively from the axis of the magazine and all having a pitch in excess of the length of the cartridges to be held in the magazine, and having the guide-path of maximum radius located in circumferential advance of the guide-path of medium radius; and the guide-path of medium radius in circumferential advance of the guide-path of minimum radius; and having the arc between the guide-paths of maximum and medium radii greater than the arc between the guide-paths of medium and minimum radii, substantially as set forth.

9. The improved cartridge magazine herein described, it consisting of a substantially cylindrical tube having made therein two helical cartridge guides comprising a main guide located and adapted for bearing upon the cartridge at a plurality of successive points in the length thereof, and a second guide located for limiting the lateral play of the point of a cartridge in the plane of its axis, the tube surface and said main guide holding the cartridge with its longitudinal axis inclined to the axis of the tube, substantially as set forth.

10. The improved cartridge magazine herein described, it consisting of a substantially cylindrical tube, whereby the external surface is adapted for use as a bearing for a relatively movable part of a gun mechanism, combined with two similarly-disposed helical guide-lines of differing radii made in said tube and comprising a main guide located and adapted for bearing upon the cartridge at two successive points thereon, and a supplemental guide-line 3, located for limiting the lateral play of the point of a cartridge while the tube and said main guide together hold the cartridge with its longitudinal axis inclined to the axis of the tube, substantially as set forth.

11. The improved cartridge magazine herein described, it consisting of a substantially cylindrical tube, whereby the external surface is adapted for use as a bearing for a relatively movable part of a gun mechanism, combined with two similarly-disposed helical inwardly-projecting cartridge guides made in said tube integrally therewith and comprising a main guide located and adapted for bearing upon the cartridge at two successive points thereon, and the supplemental guide located for limiting the lateral play of the point of a cartridge with its longitudinal axis inclined to and offset laterally of the axis of the tube, substantially as set forth.

12. In a cartridge magazine, the combination with an internal guide-surface of an approximately cylindrical arc, of a helically disposed main guide-path projecting inwardly from said surface and having a pitch-curvature in such proportion in excess of the length of the cartridge that this main guide-path bears upon a cartridge at three different points in a circumferential arc within three-fourths of a circle, thereby to hold the cartridge continuously out of alinement with and out of the plane of the axis of the magazine during the movement of the cartridge longitudinally of the magazine.

13. In a magazine for holding cartridges in end-to-end safe positions, the combination of three helical guide-lines arranged about a common axis and having a pitch in excess of the length of the cartridges, and one of said guide-lines having its location within the inclusive circle of the magazine and on the chord of an arc thereof; and circumferentially placed in opposition to the other said guide-lines, whereby the said guide-line on the chord of said arc constitutes the outer bearing-face of the point-bearing of the cartridge and thereby limits the outward radial movement of the cartridge-point by a face substantially at right-angles to the axial plane of the cartridge, substantially as set forth.

14. In a magazine for holding center-fire cartridges in end-to-end safe positions, the combination of three helical guide-lines arranged about a common axis and having a pitch substantially one and one-third times the length of the cartridges, one of said guide-lines having its location within the inclusive circle of the magazine and at the point-bearing having a face on the chord of an arc of said circle, and circumferentially placed in opposition to the other said guide-lines, and in direct opposition to the mid-bearing face on another guide-line, whereby the said guide-line face on the chord of said arc constitutes the outer bearing-face of the point-bearing of the cartridge and thereby limits the outward radial movement of the cartridge-point by a face substantially at right-angles to the axial plane of the cartridge, substantially as set forth.

15. In a cartridge magazine for holding cartridges with their axes inclined in offset axial planes, the combination with the body member having one guide-path coincident with the inclusive circle, of a helical second guide-line of a lesser radius than said circle guide-path and located for supplying two bearing-faces, one for the mid-bearing and one for the point bearing; and cartridge-guiding means coöperative therewith and offsetting the plane of the axis of the cartridge from the magazine axis by a distance substantially one-half of the inclination of the cartridge axis in said axial plane.

16. In a cartridge magazine, in combination, three helical excess-pitch guide-lines of different radii, and located at three points circumferentially of the magazine, the guide-line of minimum radius being located opposite to a line between the two coöperating guide-lines of greater radii; and having three bearing places for the cartridge, at the head, the middle and the point, respectively; the supplemental guide-line of medium radius having two bearing places for the middle and the point, respectively, of the cartridge; and the guide-line of maximum radius having a bearing place for the head only of the cartridge, whereby the cartridge axis is held inclined in the plane of its own axis, and whereby this plane is located to one side of the common guide-lines' axis.

17. In a tubular cartridge magazine, in combination with the tubular body-member, of three helical guide-lines of similar excess pitch arranged about a common guide-lines' axis and distant radially therefrom by radii of different distances respectively, and so located relatively to each other that the guide-line of maximum radius is opposite to a line between the two guide-lines of lesser radii, said guide-lines constituting bearing places for the head and also for the point of the cartridge, and at a place intermediate longitudinally and circumferentially thereto, having on the guide-line of least radius a bearing for the middle part of the cartridge, this mid-bearing being located in opposition to both the said head and point bearings for holding the cartridge in a positively-determined inclined position in the plane of its own axis, and for giving this plane and the cartridge an orbital rotation about said guide-lines' axis, and whereby the said inclination of this cartridge in the plane of its own axis is continuously maintained during the movement of the cartridge lengthwise of the magazine.

18. In a magazine for holding center-fire rimless cartridges end-to-end and with the point of one cartridge located under positive control within a circular zone surrounding the centrally located primer of the next cartridge, the combination with the helical main-guide located and having a pitch making of three successive portions in one cartridge length thereof, three bearing-faces, for the head, the middle and the point, respectively, of the cartridge; of a coöperating guide-line constituting a second bearing for the head and forming with said main-guide head-bearing face, two supports for the cartridge head when this is located eccentrically to the magazine axis; and a guide-line for the point of the cartridge and located for limiting the axial inclination thereof and thereby holding the cartridge in working relation to the said two head-bearing faces and also the mid-bearing, said main-guide having a pitch and location making said mid-bearing come in opposition to the said two supports for the head, and making the point-bearing have its location in opposition to the main-guide head-bearing, and to bear upon the cartridge point transversely to the line of action of the mid-bearing and to the line of action of the point-guide.

19. In a magazine for holding in end-to-end safe positions center-fire cartridges of the class herein described, the combination of a plurality of cartridge-bearing helical paths arranged at different circumferential positions respectively, in the magazine, and having a pitch of substantially one and one-third times the length of the cartridge and having the radial distances of the respective bearing-paths arranged with a minimum radius for three cartridge-bearing faces, at a medium radius for two bearing faces, and at a maximum radius for one bearing face, and having these bearing faces extend for one cartridge substantially two-thirds of the length of the helical pitch, and conforming to cartridges characterized by the two-cylinder formation herein described, when the planes of the axes of successive cartridges are disposed in transverse positions and with the said axial planes off-set from the axis of the magazine, and, with the axis of the cartridge inclined in the plane of its axis by a distance equal to substantially twice the radius of the orbit of the center of the cartridge head, whereby to obtain and maintain a relatively large distance between the point-center of one cartridge and the head-center of a contiguous cartridge while keeping the inclination of the cartridge axis at a minimum in its own plane.

20. In a magazine for holding in end-to-end safe positions cartridges of the class herein described, the combination of a plurality of helical bearing-paths arranged at different circumferential positions, respectively, within the magazine, and having a pitch of more than one and one-fourth times the length of the cartridge and having the radial distances of the respective bearing-paths arranged with a minimum radius for three bearing-faces, and at greater radii for three other bearing-faces, thereby to hold cartridges with the planes of the axes of successive contiguous cartridges disposed substantially at right-angles to each other; with the said axial planes off-set from the axis of the magazine, and, with the axis of the cartridge inclined in the plane of its axis by a distance less than the distance between the point-center of one cartridge and the head-center of a contiguous cartridge.

21. In a tubular magazine for holding in end-to-end safe positions cartridges of the class herein described, the combination with the tubular body-member, of three helical guide-paths arranged at different circumferential positions respectively, in the magazine, and having a pitch of more than one and one-fourth times the length of the cartridge and having the radial distances of the respective bearing-paths arranged with a minimum radius for three bearing-faces, at a greater radius for two bearing-faces and at a maximum radius for one bearing-face, thereby to hold cartridges with the planes of the axes of successive contiguous cartridges disposed substantially at right-angles to each other; with the said axial planes off-set from the axis of the magazine, and, with the axis of the cartridge inclined in the plane of its axis by a distance less than the radial distance between the point-center of one cartridge and the head-center of a contiguous cartridge.

22. In a tubular magazine for holding in end-to-end safe positions center-fire cartridges, the combination with the tube wall, of a plurality of helical guide-lines supplying bearing surfaces located at different radial distances, respectively, from a common axis, and having as one of these a main guide-line located and of a curvature which offsets the cartridge and the plane of its axis to one side of the said common axis, and having a second guide-line of relatively greater radius and located at substantially one-fourth of a revolution circumferentially of the magazine from the said main guide-line, and arranged for supplying one bearing-face for the mid-bearing of the cartridge and one bearing-face for the point-bearing of the cartridge, this point-bearing face being located for co-acting with the other bearing faces in limiting the inclination of the cartridge axis in the plane of its axis while also forming one face in a triangulation for assisting in holding the cartridge in its said off-set position, substantially as set forth.

23. In a cartridge magazine for holding a series of rimless center-fire cartridges end to end and for holding each cartridge in an inclined position relatively to the magazine axis and to the axes of other contiguous and similar cartridges, the combination of three helical bearing-lines located at three radial distances, respectively, from the axis of the magazine and having a helical pitch of substantially one and one-third times the length of the cartridge, the said bearing-lines being organized and circumferentially spaced substantially as described for thereby supplying for each cartridge six bearing faces, located two of them for a head-bearing, two for a mid-bearing, and two for a point-bearing, and having three of said bearing-faces supplied by the said bearing-line of least radius, two supplied by the bearing line of medium radius, and one supplied by the said bearing line of maximum radius, and having the support-angles of the head-bearing, the mid-bearing, and the point-bearing, associated together to constitute a cartridge-inclosing system of triangularly-disposed bearing-faces, substantially as set forth.

24. In a magazine for holding cartridges in end-to-end safe positions, the combination with a tube wall, of three helical guide-line surfaces located at different radial distances respectively, from a common axis, and having one of said guide-lines located and of a curvature which offsets the plane of the axis of the cartridge to one side of the said common axis, and having the second guide-line of medium radius located at substantially one-fourth of a revolution circumferentially of the magazine from the said main guide-line and arranged for supplying one bearing-face for the mid-bearing of the cartridge and one bearing-face for the point-bearing of the cartridge, this point-bearing face being located for co-acting with the other bearing faces in limiting the inclination of the cartridge axis while in its said off-set position and by a face transverse to the axial-plane, substantially as set forth.

25. In a magazine for holding in end-to-end safe positions cartridges of the class herein described characterized by the two-cylinder formation set forth, the combination with a tube wall forming the body of the magazine and having at its inner surface a guide-path in position for supporting the head of the cartridge when this is off-set from the magazine axis and is inclined in the plane of its own axis by substantially twice the amount of such off-set distance, and a plurality of helically disposed guide-surfaces located within the magazine tube and having a similar curvature and pitch, and both of lesser radius than the said head-supporting guide-path, the said guide-surfaces of reduced radii being located circumferentially of the magazine for bringing the same into positions for supporting the middle of the cartridge on the side thereof in opposition to the head-bearing and for supporting the point of the cartridge in opposition to the said middle-bearing, and thereby maintain the cartridge in its said off-set and axially inclined positions throughout its longitudinal movement within the magazine, and maintain the point of one cartridge in the safe zone of the head of a contiguous center-fire cartridge.

26. In a magazine for holding center-fire cartridges in end-to-end safe positions, and in the described off-set and inclined positions required therefor, the combination with a body member for the magazine, of two helical guide-lines located circumferentially of the magazine at substantially one-fourth of a circle apart, and having one said guide-line extending around and within the magazine for substantially three-fourths of a circle in one cartridge length thereof, whereby these two arcs of about one-fourth and of about three-fourths of a circle respectively, together extend entirely around the magazine and thereby encompass the cartridge with bearing-faces spaced and located for supporting the cartridge at three places in the length thereof and in the off-set and inclined position for maintaining the end-to-end safe positions of successive cartridges relatively to each other, substantially as set forth.

27. In a magazine for holding center-fire cartridges in end-to-end safe positions, the combination of two helical guide-lines located circumferentially of the magazine at substantially one-fourth of a circle apart, and located at different radial distances from a common axis, and having the guide-line of least radius extending around said axis for substantially three-fourths of a circle in one cartridge length thereof and having these two arcs of substantially one-fourth and three-fourths of a circle, respectively, together extend entirely around the magazine for thereby so locating and spacing the cartridge supporting faces of and on said guide-lines as to maintain the cartridges in the required end-to-end safe positions, substantially as described.

28. In a magazine for holding cartridges characterized by the formation herein set forth, in the described end-to-end safe positions, the combination, with the tube constituting the body member of the magazine and of a size for supplying on its circular inner surface one bearing-face of a head-bearing for a cartridge located eccentrically therein, of two helical guide-lines having a pitch in excess of the cartridge length and located at different distances respectively, from a common axis, and having on one said guide-line a relatively long bearing-range extending from the head to near the point of the cartridge and located for supplying three bearing-faces for said cartridge, and having on the other said guide-line a relatively shorter bearing-range extending from near the middle to near the point of the cartridge, and located for supplying two bearing-faces for the cartridge, these two bearing-ranges together extending around the circle of the magazine, whereby the tube-surface and the two guide-lines together supply a system of cartridge supporting faces located at intervals circumferentially and longitudinally of the magazine, and thereby form three bearings, for the head, the middle, and the point, respectively, of the said cartridge when this is located eccentrically and inclined in the magazine.

29. In a magazine for holding eccentrically located therein, center-fire cartridges characterized by the formation substantially such as herein set forth, in end-to-end safe positions, the combination with the body member of the magazine, of two helical guide-lines having a pitch in excess of the cartridge length and located at different distances respectively, from a common axis, and having on one said guide-line a relatively long bearing-range, as $4^a$ to $4^c$, extending longitudinally from the head to a bearing-place near the point of the cartridge and extending circumferentially only partially around the magazine and a cartridge located therein, and having on the other said guide-line a relatively shorter bearing-range, as $3^b$ to $3^c$, extending to a bearing-place near the point of the cartridge, these two bearing-ranges together extending completely around the circle of the magazine and around the cartridge located eccentrically therein, whereby the two guide-lines together supply a system of cartridge supporting faces located at intervals circumferentially and longitudinally of the magazine and which constitute a mid-bearing, and a point-bearing for each of a series of the said cartridges.

30. The herein described improvement in magazines for holding rimless center-fire cartridges in end-to-end safe positions, it consisting of a tubular member combined with two helically located cartridge-supporting bearing-paths having a pitch of substantially one and one-third times the length of the cartridge, and located at different radial distances, respectively, from an axis common to all of said bearing-paths and the tubular member, one of said bearing-paths being located and adapted for bearing upon the cartridge at three successive points in the length thereof, and the other of said bearing-paths being located and adapted for bearing upon the cartridge at two points, thereby to co-act with the inner surface of the tube and with said other bearing-path for holding the cartridge with its longitudinal axis off-set from and inclined to the axis of the tube, substantially as set forth.

31. The herein described improvement in magazines for holding center-fire cartridges in end-to-end safe positions, it consisting of a tubular member combined with two helically located cartridge-supporting bearing-paths of three varying curvatures, respectively, and located one for bearing upon the cartridge at three successive points in the length thereof, and the other for bearing upon the cartridge at two points, and thereby co-act with the inner surface of the tube and with said other bearing-path for holding the cartridge with its longitudinal axis off-set from and inclined to the axis of the tube, substantially as set forth.

32. The herein described improvement in magazines for holding center-fire cartridges in end-to-end safe positions, it consisting of a substantially cylindrical tube having therein two helical guide-lines comprising a main guide-line located and adapted by its curvature for bearing upon an off-set and inclined cartridge at three successive points circumferentially and longitudinally thereof, and a second guide-line located for limiting the lateral play of the point of a cartridge away from the main guide-line while the tube and said main guide-line hold the cartridge with the plane of its axis off-set from the tube center, and with its axis inclined in such axial plane.

33. The herein described improvement in magazines for holding center-fire cartridges of the two-cylinder formation set forth, in end-to-end safe positions, it consisting of a substantially cylindrical tube having therein two helical guide-lines comprising a main guide-line having a radial distance from the common axis of the guide-lines and tube less than the smaller cylinder of such cartridge formation, and located and adapted by its curvature for bearing upon an off-set and inclined cartridge at three successive points circumferentially and longitudinally thereof and thereby holding the cartridge with the plane of its axis off-set from said common axis; and a second guide-line having a larger radius than said main guide-line and located for limiting the lateral play of the point of a cartridge away from the main guide-line, and coacting with the tube and main-guide-line for holding the cartridge with its axis inclined in such axial plane, and for so locating this plane as to bring this axis within substantially one quadrant of the magazine circle.

34. In a magazine for holding cartridges such as described in end-to-end safe positions, the combination with a body member, of three helical guide-paths having a curvature extending through a circumferential arc of not less than two-thirds and not more than four-fifths of the magazine circumference in one cartridge-length thereof, and comprising a main guide-path adapted for and supplying one bearing-face at the head and another at the point of the cartridge, said three guide-paths being spaced radially and circumferentially of the magazine for holding the cartridge with its off-set and inclined axis extending through the complemental circumferential arc of the magazine circle, whereby these two circumferential arcs extend around the magazine, substantially as set forth.

35. In a magazine for holding cartridges such as described in end-to-end safe positions, the combination with a body member, of three helical guide-paths having a curvature extending through substantially three-fourths of the magazine-circumference in one cartridge-length thereof, and comprising a main guide-path adapted for and supplying one bearing-face at the head and another at the point of the cartridge, said three guide-paths being spaced radially and circumferentially of the magazine for holding the cartridge with its off-set and inclined axis extending circumferentially through substantially one-fourth of the magazine circle, whereby these two circumferential arcs extend substantially around the magazine.

36. In a magazine for holding cartridges such as described in end-to-end safe positions, the combination with a body member, of helical guide-paths having a curvature extending through an arc of between two-thirds and four-fifths of the magazine circumference in one cartridge-length thereof, and comprising a main guide-path adapted for and supplying one bearing-face at the head and another at the point of the cartridge, said guide-paths being spaced radially and circumferentially of the magazine for holding the cartridge with its off-set and inclined axis extending circumferentially through the complemental arc of the magazine circle, whereby these two complemental circumferential arcs extend around the magazine.

37. In a magazine for holding in end-to-end safe positions a series of cartridges, the combination of three helical guide-lines arranged about a common axis and having a pitch greater than the cartridge-length and having different curvatures, respectively, and comprising for each cartridge six bearing-faces grouped on said guide-lines as one, and two, and three, respectively, and located to form triangulations arranged in a system of rectangularly-disposed cartridge-controlling supports.

38. In a magazine for holding in end-to-end safe positions a series of cartridges, the combination of three excess-pitch helical guide-lines having bearing-paths located at different radial distances, respectively, from a common axis and arranged for supplying for each cartridge a head-bearing, a mid-bearing, and a point-bearing, located for and forming four triangulations which are also arranged substantially as described to form a system of rectangularly-disposed cartridge-controlling supports for holding each cartridge off-set from said common axis, and also inclined in the plane of its own axis, whereby to hold successive contiguous cartridges with their axial planes in transverse directions.

39. In a magazine for holding center-fire cartridges in end-to-end safe positions by the method of off-setting the planes of the cartridge axes and holding these axes inclined in such planes, the combination, with a tubular body member, of a plurality of guide-path surfaces of lesser radius than the body member, and having a helical pitch of not less than one and one-fourth and not more than one and one-third times the length of the cartridge, and said tubular member having an internal bearing surface of a diameter not less than one and one-third and not more than one and one-half times the diameter of the larger cylinder, as 10, of said cartridge-formation, whereby the off-set distance of the plane of the cartridge axes may be made substantially one-half of the inclination of the bearing-range portion of the cartridge axis in such off-set plane, substantially as described.

40. In a cartridge magazine for holding cartridges in end-to-end contact and in relatively inclined positions to the magazine axis and to each other, the combination of a plurality of helical bearing lines, substantially such as described, located circumferentially of the magazine at varying arcs from each other and located diametrically of the magazine to form for each successive cartridge a plurality of bearing faces which are operative on each cartridge at three places in the length thereof, for thereby holding one cartridge with its axial plane transversely to and substantially three-fourths of one orbital revolution in advance of the next preceding and contiguous cartridge and thereby bring the direct distance between the point-center of one cartridge and the head-center point of the next forward and contiguous cartridge, to a distance in excess of the height of the angle of inclination of one cartridge axis in the plane of its axis, substantially as set forth.

41. In a cartridge magazine for holding cartridges of the class described in end-to-end contact and in relatively inclined positions to the magazine axis and to each other, the combination of three bearing lines located circumferentially of the magazine at varying arcs from each other and so located diametrically of the magazine to form for each successive cartridge a plurality of bearing faces and operative on each cartridge at three points in the length thereof, and thereby hold one cartridge with its axial plane transversely to and substantially three-fourths of one orbital revolution in advance of the next preceding and contiguous cartridge, whereby to bring the direct distance between the point-center of one cartridge and the head-center of the next forward and contiguous cartridge, to a distance in excess of the height of the angle of inclination of one cartridge axis in the plane of its axis, substantially as set forth.

42. In a magazine for holding a series of center-fire cartridges, of the character herein set forth, in end-to-end safe positions, the combination of a plurality of helical guide-lines located at different positions circumferentially of the magazine and having a pitch in excess of the length of the cartridge, said guide-lines being located and combined for supplying for each cartridge the head-bearing, mid-bearing, and point-bearing in the circumferential positions in which the head-bearing chord and point-bearing chord of one cartridge are located in the same direction. and with the mid-bearing chord thereof in a transverse direction, and whereby the next contiguous cartridge is held in a different circumferential position and with its head-bearing chord in a direction transverse to the point-bearing chord of such next preceding cartridge, substantially as set forth.

43. In a magazine for holding a series of center-fire cartridges of the character herein set forth, in end-to-end safe positions, the combination of a plurality of helical guide-lines located one of them in a circumferential position substantially one-fourth of a circle in advance of another of them, and each having a pitch of substantially one and one-third times the length of the cartridge, the said guide-lines being all located and combined for supplying for each cartridge a head-bearing, mid-bearing, and point-bearing in the circumferential positions in which the head-bearing chord and point-bearing chord of one cartridge are located in the same direction, and the mid-bearing chord thereof in a transverse direction, and whereby the next successive and contiguous cartridge is held with its head-bearing chord in a circumferential position substantially one-fourth of a circle in advance of and substantially right-angles to the point-bearing chord of such next preceding cartridge, substantially as set forth.

44. In a magazine for holding center-fire cartridges in off-set and inclined positions, and for holding successive contiguous cartridges with their axes inclined in transverse planes at about right-angles to each other, in combination, a tubular body member circular in section, and three helical guide-paths having a pitch substantially greater than the length of the cartridge, and having different radial distances respectively from a common axis, one of these paths being on the inner surface of such body member, and another of such guide-paths having a radius less than the largest radius of the cartridge, and said three guide-paths having locations and curvatures whereby to bring the inclined axes of contiguous cartridges within circumferentially adjacent arcs of the magazine circle, substantially as described.

45. In a magazine for holding a series of center-fire cartridges having the described two-cylinder formation, in off-set and inclined positions and for holding successive contiguous cartridges with the planes of their axes in transverse directions, and having an orbital axis about which the cartridges revolve during their longitudinal movement, in combination, a body member, and three helical guide-paths having a pitch substantially one and one-third times the length of the cartridge, and having different radial distances from the orbital axis, one of these paths being on the inner surface of such body member, and another of such guide-paths having a radius less than the radius of the cartridge, and said three guide-paths having locations and curvatures substantially as described for off-setting the plane of the cartridge to the position for bringing its inclined axis substantially within one quadrant of the magazine circle, and to the position whereby this axis forms, in end view of the magazine, the hypotenuse of a right-angle triangle, the base of which is substantially one-half of such hypotenuse, and the base and height of which when added are substantially as great as the required lateral distance for holding the point of one cartridge within the safe-zone of the head of a contacting cartridge which has its axis similarly located in an adjacent quadrant of the said circle.

46. In a magazine for holding center-fire cartridges of two-cylinder formation in off-set and inclined positions and holding successive contiguous cartridges with their axes inclined in transverse axial planes, in combination, a body member, and three helical guide-paths having a pitch substantially one and one-third times the length of the cartridge, and having different radial distances from a common axis, one of such guide-paths having a radius less than the radius of the cartridge, and having a location and curvature for off-setting the cartridge to the position for bringing its inclined axis within substantially one quadrant of the magazine circle, and to a position whereby this axis forms, in end view of the magazine, the hypotenuse of a triangle the base and height of which when added are equal to the distance required for holding the point of one cartridge within the safe-zone of the head of a contacting cartridge which has its axis similarly located in an adjoining quadrant of such circle.

47. In a magazine for holding center-fire cartridges in off-set and inclined positions and successive contiguous cartridges with the planes of their axes in transverse directions, in combination, a tubular body member, and three helical guide-paths having a pitch longer than the cartridge, and having different radial distances from a common axis, said guide-path of least radius being located and curved for off-setting the plane of the cartridge to the position for bringing its inclined axis within substantially one quadrant of the magazine, whereby this axis forms, in end view of the magazine, the hypotenuse of a triangle the base and height of which when added, make up a distance as required diametrically of the magazine between the head-center and the point-center of contacting cartridges.

48. In a magazine for holding center-fire cartridges having the described two-cylinder formation in end-to-end safe positions, the combination with the tubular body member, of two helical guide-lines of different radii and having a pitch in excess of the cartridge-length, and located one in circumferential advance of the other by the amount of the arc occupied by the cartridge axis, the helical pitch and said angle of guide-line advance being such that the said similar arcs are substantially coincident at a position near to the mid-bearing of the cartridge, and thereby bring these two guide-lines into position for supplying mid-bearing faces on the larger cylinder, and point-bearing faces on the smaller cylinder of the cartridge formation; and thereby bring the chords of these bearings to transverse positions; and bring said guide-line having the greater radius to a location into and transversely of the plane of the cartridge axis for thereby making this guide-line serve as a point-movement-limiter for the cartridge, substantially as set forth.

49. In a magazine for holding cartridges in end-to-end safe positions, the combination with one guide-path located for supporting one side of the cartridge-head, of the helical main guide-line having three adjacent guide-paths and curved and located at a radial distance from the magazine for these guide-paths to supply supporting faces for the head, the middle, and the point, respectively, of the cartridge; and, the supplemental guide-line located at a greater radial distance than said main guide-line from said magazine axis and having two adjacent guide-paths, and curved and circumferentially located substantially as described for these guide-paths to furnish supporting faces for the middle and the point of the cartridge.

50. In a tubular magazine for holding in end-to-end safe positions a series of center-fire cartridges, and in which two successive contiguous cartridges are to be located with their axial planes in transverse positions and off-set from an orbital axis common to both cartridges, for bringing each said cartridge axis when inclined in its said plane into substantially one quadrant of the circle of the magazine, the combination with the magazine tube and with a guide-line, as 3, which is located and has a curvature for furnishing support to the middle and to the point of the cartridge located as set forth, of the guide-line 4 located and having a curvature for supporting at one side thereof the point of one cartridge, and for supporting on the other side thereof the head of the next successive contiguous cartridge, and thereby continuously hold said transversely inclined cartridges with their point and head centers substantially on a diametrical line through the orbital axis.

51. In a cartridge magazine, in combination, three helical guide-lines of similar pitch and different curvatures arranged about a common guide-lines axis and distant radially therefrom by radii of different distances respectively, and so located relatively to each other that the guide-line of maximum radius is located in opposition to the two guide-lines of lesser radii, said guide-lines constituting bearing places for the head and also for the point of the cartridge, and at a place intermediate longitudinally and circumferentially thereto, having on the guide-line of least radius a bearing for the middle part of the cartridge, this middle bearing being located in opposition to both the said head and point bearings, and holding the cartridge positively in an inclined position in the off-set plane of its own axis, whereby this plane and the cartridge are given an orbital rotation about said guide-lines axis during the movement of the cartridge lengthwise of the magazine without deviation from its off-set and inclined position.

52. In a cartridge magazine, in combination, three helical guide lines of similar pitch arranged about a common guide-lines axis and distant radially therefrom by radii of different distances respectively, and circumferentially located relatively to each other with the guide-line of maximum radius located in opposition to the two guide-lines of lesser radii, said guide-lines constituting bearing places for the head and also for the point of the cartridge; and at a place intermediate longitudinally and circumferentially thereto, having on the guide-line of least radius a bearing for the middle part of the cartridge, this middle bearing being located in opposition to both the said head and point bearings, whereby the cartridge is held in an off-set and inclined position, substantially as described.

53. In a cartridge magazine of the class described, the combination of three helical guide-lines having a similar pitch-length which is in excess of the cartridge-length, and all arranged about a common guide-lines axis and distant therefrom by radii of different distances respectively, and located with the guide-line of greater radius opposite to a line between the two guide-lines of lesser radii, said guide-lines constituting bearings at two places for the head and at two other places for the point of each cartridge in a series of cartridges, and at a place intermediate longitudinally and circumferentially to such head and point bearings, having a bearing for each cartridge on the guide-line of least radius and located in opposition to both the said head and point bearings, for thereby holding each cartridge of the series in a positively-determined inclined position in the plane of its own axis, and for thereby giving these planes and the cartridges an orbital rotation about said guide-lines axis during the movement of the cartridge lengthwise of the magazine, whereby the said axial plane of one cartridge is located and maintained transversely to that of a following contiguous cartridge during such movement, substantially as specified.

54. In a cartridge magazine, the combination of three helical guide-lines of similar spirality and having a pitch of substantially one and one-third times the cartridge-length, and arranged about a common guide-lines axis and distant therefrom by radii of different distances respectively, and located with the guide-line of greater radius opposite to a line between the two guide-lines of lesser radii, said guide-lines constituting bearings at two places for the head and at two other places for the point of each cartridge in a series of cartridges, and at a place intermediate longitudinally and circumferentially to such head and point bearings, having a bearing for each cartridge on the guide-line of least radius and located in opposition to both the said head and point bearings, whereby each cartridge of the series is held in a positively-determined inclined position in the plane of its own axis, and whereby this plane and the cartridge are given an orbital rotation about said guide-lines axis during the movement of the cartridge lengthwise of the magazine, and whereby the said axial plane of one cartridge is located and maintained transversely to that of a following cartridge, substantially as specified.

55. In a cartridge magazine for center-fire cartridges, the combination of three helical bearing-lines located at three radial distances, respectively, from the axis of the magazine and having a helical pitch of substantially one and one-third times the length of the cartridge, the said bearing-lines being organized and circumferentially spaced substantially as described for thereby supplying for each cartridge six bearing faces, located two of them for a head-bearing, two for a mid-bearing, and two for a point-bearing, and having three of said bearing-faces supplied by the said bearing-line of least radius, two supplied by the bearing-line of medium radius, and one supplied by the said bearing-line of maximum radius, the organization being such that the support-angles of the head-bearing, the mid-bearing, and the point-bearing, when associated together, constitute a cartridge-inclosing system of triangularly-disposed bearing faces, substantially as set forth.

56. In a cartridge magazine for holding center-fire cartridges in end-to-end contact and for holding each cartridge in an inclined position relatively to the magazine axis and to the axes of other contiguous and similar cartridges, the combination of three helical bearing-lines located at three radial distances, respectively, from the axis of the magazine and having a helical pitch of a substantial excess over the length of the cartridge, the said bearing-lines being organized substantially as described for thereby supplying for each cartridge six bearing faces, located two of them for a head-bearing, two for a mid-bearing, and two for a point-bearing, and having three of said bearing-faces located on and supplied by the said bearing-line of least radius, two located on and supplied by the bearing-line of medium radius, and one located on and supplied by the said bearing-line of maximum radius, and having the support angles of the head-bearing, the mid-bearing, and the point-bearing, when associated together, compose a support angle figure which approximates an equilateral triangle, substantially as set forth.

57. In a cartridge magazine of the class described, the combination with a body member, of three helical guide-paths which comprise a main guide-path which is the guide-path of least radius, and which has its curved cartridge-supporting surface in position for bearing on the off-set and inclined cartridge at three points in the length thereof, and for bearing thereon in circumferential positions, locating its bearing-faces at $4^a$, $4^b$, and $4^c$, at the angles of triangulations which, in end view of the magazine, surround the inclined axis of the cartridge, substantially as set forth.

58. In a cartridge magazine of the class described, the combination with the tubular body member of three helical guide-paths having a pitch of substantially one and one-third times the length of the cartridges to be held therein, which comprise a main guide-path which is the guide-path of least radius, and is located with its cartridge-supporting surface in position for bearing upon an off-set and inclined cartridge at three points in the length thereof, and for bearing thereon in the three circumferential positions, $4^a$, $4^b$, and $4^c$, at the angles of triangulations which, in end view of the magazine, surround the inclined axis of the cartridge, substantially as set forth.

59. In a cartridge magazine of the class described, the combination with the tubular body member having its interior surface adapted for use as one guide-path for the head of a cartridge, of the two helical guide-lines comprising a main guide-line which is also the guide-line of minimum radius, and the guide-line 3 located circumferentially in advance of said main guide-line, these two guide-lines having a pitch in excess of the length of the cartridges to be held in the magazine, the said guide-lines and the tubular member being proportioned and organized together for holding the cartridge off-set from the axis of the magazine, and with its axis inclined in the plane of its axis, and the said guide-line 3 being located circumferentially in advance of said main-guide by an arc substantially equal to the axial arc of the cartridge axis, and having a curvature which brings the said guide-line 3 into substantially longitudinal alinement at the point of one cartridge with the said main bearing-line at the head end of the same cartridge, whereby a helical pitch of substantially three-fourths of a circle in one cartridge length, combined with a guide-arc of substantially one-fourth of a circle and the axial-arc of substantially one-fourth of a circle, brings the said points on the said guide-lines into such longitudinal alinement.

JOHN D. PEDERSEN.

Witnesses:
F. A. HAUGHTON,
JOHNSON MORGAN.